United States Patent
Guo et al.

(10) Patent No.: US 12,160,915 B2
(45) Date of Patent: Dec. 3, 2024

(54) MULTI-LINK COMMUNICATION METHOD AND RELATED DEVICE

(71) Applicant: HUAWEI TECHNOLOGIES CO., LTD., Guangdong (CN)

(72) Inventors: Yuchen Guo, Shenzhen (CN); Yunbo Li, Shenzhen (CN); Guogang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/330,352

(22) Filed: Jun. 6, 2023

(65) Prior Publication Data

US 2023/0319928 A1 Oct. 5, 2023

Related U.S. Application Data

(63) Continuation of application No. 17/568,489, filed on Jan. 4, 2022, which is a continuation of application No. PCT/CN2020/100039, filed on Jul. 3, 2020.

(30) Foreign Application Priority Data

Jul. 5, 2019 (CN) .......................... 201910608995.2

(51) Int. Cl.
*H04W 4/00* (2018.01)
*H04L 47/34* (2022.01)
(Continued)

(52) U.S. Cl.
CPC ............. *H04W 76/15* (2018.02); *H04L 47/34* (2013.01); *H04W 76/11* (2018.02)

(58) Field of Classification Search
CPC ........ H04W 76/15; H04W 76/11; H04L 47/34
See application file for complete search history.

(56) References Cited

U.S. PATENT DOCUMENTS

2011/0188487 A1 8/2011 Seok
2017/0257189 A1 9/2017 Jiang et al.
(Continued)

FOREIGN PATENT DOCUMENTS

CN 1917508 A 2/2007
CN 105743620 A 7/2016
(Continued)

OTHER PUBLICATIONS

IEEE 802.11-19/1549r0, Yunbo Li et al., Multi-link Association, Sep. 2019, total 11 pages.
IEEE 802.11-19/0822r0, Po-Kai Huang et al, Extremely Efficient Multi-band Operation, May 2019, total 25 pages.
IEEE Std 802.11-2016, IEEE Standard for Information technology—Telecommunications and information exchange between systems Local and metropolitan area networks-Specific requirements, Part 11: Wireless LAN Medium Access Control (MAC) and Physical Layer (PHY) Specifications, Approved Dec. 7, 2016, total 3534 pages.
(Continued)

*Primary Examiner* — Omoniyi Obayanju
(74) *Attorney, Agent, or Firm* — Gregg Jansen

(57) ABSTRACT

Embodiments of this application disclose a multi-link communication method and a related apparatus. The method includes: a first station sends, on a first link, a radio frame to a second station, where the first station is one of multiple stations included in a first multi-link device. The multiple stations included in the first multi-link device work on multiple links, and the multiple links include a first link on which the first station works. The radio frame includes at least two management frames, the at least two management frames are generated by at least two stations that work on different links in the first multi-link device, and the second station is one of multiple stations included in a second multi-link device.

20 Claims, 14 Drawing Sheets

(51) Int. Cl.
*H04W 76/11* (2018.01)
*H04W 76/15* (2018.01)

(56) References Cited

U.S. PATENT DOCUMENTS

| | | | |
|---|---|---|---|
| 2018/0092039 A1* | 3/2018 | Cariou | H04W 52/0235 |
| 2018/0206190 A1 | 7/2018 | Cherian et al. | |
| 2019/0335454 A1* | 10/2019 | Huang | H04W 72/542 |
| 2021/0282229 A1* | 9/2021 | Stacey | H04W 88/10 |

FOREIGN PATENT DOCUMENTS

| | | |
|---|---|---|
| CN | 105813075 A | 7/2016 |
| CN | 108011688 A | 5/2018 |
| CN | 108271239 A | 7/2018 |
| EP | 1589704 A2 | 10/2005 |
| JP | 2014520445 A | 8/2014 |
| JP | 2015180108 A | 10/2015 |
| KR | 101430876 B1 | 8/2014 |
| WO | 2018136516 A1 | 7/2018 |

OTHER PUBLICATIONS

Yongho Seok (MediaTek), Multi-link Operation, IEEE 802.11-19/0731r0, IEEE, May 15, 2019, total:17pages.
Po-Kai Huang et al, Extremely Efficient Multi-band Operation, May 12, 2019, IEEE 802.11-19/0822r9, 31 Pages.
IEEE 802.11-19/0731r0, Yongho Seok et al., EHT Multi-link Operation, May 2019, total 17 pages.
IEEE P802.11ax/D2.2, Feb. 2018, Draft Standard for Information technology—Telecommunications and information exchange between systems Local and metropolitan area networks-Specific requirements—Part 11: Wireless LAN Medium Access Control(MAC) and Physical Layer (PHY) Specifications, Amendment 6: Enhancements for High Efficiency WLAN. 620 pages.
Liwen Chu et al, Multiple Band Operation Discussion, May 14, 2019, IEEE 802.11-19/0821r5, 10 Pages.

* cited by examiner

| Sequence | Information |
|---|---|
| 1 | Type |
| 2 | EHT action frame |
| 3 | Number of OCT MMPDUs |
| 4 | OCT MMPDU |
| 5 | Multi-link |
| 6 | Multi-link source |
| ... | ... |
| 3N | OCT MMPDU |
| 3N+1 | Multi-link |
| 3N+2 | Multi-link source |

| Element ID | Length | Multi-band control | Band identifier | Operating class | Channel number | Basic service set identifier | Beacon interval |

FIG. 8

| Sequence | Information |
|---|---|
| 1 | Type |
| 2 | EHT action frame |
| 3 | Total length |
| 4 | OCT MMPDU |
| 5 | Multi-link |
| 6 | Multi-link source |
| ... | ... |
| 3N | OCT MMPDU |
| 3N+1 | Multi-link |
| 3N+2 | Multi-link source |

FIG. 9

| Sequence | Information |
|---|---|
| 1 | Type |
| 2 | EHT action frame |
| 3 | Number of MMPDUs |
| 4 | Temporary starting sequence number |
| 5 | OCT MMPDU |
| 6 | Multi-link |
| 7 | Multi-link source |
| 8 | CRC |
| ... | ... |
| 4N | OCT MMPDU |
| 4N+1 | Multi-link |
| 4N+2 | Multi-link source |
| 4N+3 | CRC |

| Sequence | Information |
|---|---|
| 1 | Type |
| 2 | Block acknowledgment action frame |
| 3 | Dialog token |
| 4 | Block acknowledgment parameter set |
| 5 | Block acknowledgment timeout value |
| 6 | Block acknowledgment starting sequence control |
| ... | ... |
|  | Multi-link element |
|  | Multi-link element |

MULTI-LINK COMMUNICATION METHOD AND RELATED DEVICE

CROSS-REFERENCE TO RELATED APPLICATIONS

This application is a continuation of U.S. patent application Ser. No. 17/568,489, filed on Jan. 4, 2022, which is a continuation of International Application No. PCT/CN2020/100039, filed on Jul. 3, 2020, which claims priority to Chinese Patent Application No. 201910608995.2, filed on Jul. 5, 2019. All of the afore-mentioned patent applications are hereby incorporated by reference in their entireties.

TECHNICAL FIELD

This application relates to the field of communication technologies, and in particular, to a multi-link communication method and a related device.

BACKGROUND

With development of wireless technologies, a multi-link device may support multi-link communication. For example, the multi-link device performs communication on bands of 2.4 GHz, 5 GHz, and 60 GHz simultaneously. Even when a number of antennas is limited, the multi-link device may perform switching on different bands, to select an optimal band, and ensure communication quality. If two multi-link devices need to use an advanced feature such as a block acknowledgment (BA) or target wake time (TWT) on multiple links, a corresponding management frame needs to be sent on each of the multiple links to set up a corresponding function. According to an on channel tunneling (OCT) mechanism defined in the 802.11 standard, a management frame of one link may be sent on another link. However, as a number of links increases, if management frames of multiple links need to be sent, sending of the management frames is time-consuming, and efficiency is low.

SUMMARY

Embodiments of this application provide a multi-link communication method and a related device, to improve communication efficiency.

According to a first aspect, an embodiment of this application provides a multi-link communication method, including: A first station generates a radio frame, where the first station is one of multiple stations included in a first multi-link device. The multiple stations included in the first multi-link device work on multiple links, and the multiple links include a first link on which the first station works. The first station sends, on the first link, the radio frame to a second station, where the radio frame includes at least two management frames, the at least two management frames are generated by at least two stations that work on different links in the first multi-link device, and the second station is one of multiple stations included in a second multi-link device. One radio frame carries at least two management frames generated by at least two stations on different links, so that communication efficiency is improved.

According to a second aspect, an embodiment of this application provides a multi-link communication method, including: A second station receives, on a first link, a radio frame sent by a first station, where the first station is one of multiple stations included in a first multi-link device, and the second station is one of multiple stations included in a second multi-link device. The multiple stations included in the second multi-link device work on multiple links, and the multiple links include the first link on which the second station works. The radio frame includes at least two management frames, and the at least two management frames are generated by at least two stations that work on different links in the first multi-link device. One radio frame carries at least two management frames generated by at least two stations on different links, so that communication efficiency is improved.

In an embodiment of the first aspect or the second aspect, the radio frame includes at least two pieces of link indication information, one piece of link indication information corresponds to one management frame, and the link indication information is used to indicate a link corresponding to the management frame. The link indication information indicates a link on which a station corresponding to a management frame works, so that each management frame can correctly apply to a corresponding link.

In an embodiment of the first aspect or the second aspect, the link indication information is a link information element, and the link information element includes identification information of the link corresponding to the management frame. The identification information of the link includes at least one of a band identifier, a channel number, and an operating class. The identification information of the link indicates a link on which a station corresponding to a management frame works, so that each management frame can correctly apply to a corresponding link.

In an embodiment of the first aspect or the second aspect, the link indication information is a multi-band element, and the multi-band element includes a band identifier, a channel number, and an operating class. The multi-band element indicates a link on which a station corresponding to a management frame works, so that each management frame can correctly apply to a corresponding link.

In an embodiment of the first aspect or the second aspect, the radio frame includes at least two cyclic redundancy check fields, one cyclic redundancy check field corresponds to one management frame, and the cyclic redundancy check field is used to check correctness of the management frame and the link indication information. This ensures the correctness of the management frame and the link indication information.

In an embodiment of the first aspect or the second aspect, the radio frame includes first indication information, and the first indication information is used to indicate a number of the at least two management frames.

In an embodiment of the first aspect or the second aspect, the radio frame includes second indication information, and the second indication information is used to indicate a total length of the at least two management frames and the at least two pieces of link indication information.

In an embodiment of the first aspect or the second aspect, when frame types and subtypes of the at least two management frames are the same, the at least two management frames include a $1^{st}$ management frame and another management frame other than the $1^{st}$ management frame. The $1^{st}$ management frame includes a first type information element and a second type information element, and the another management frame includes the second type information element. The first type information element carries common information of the at least two management frames, and the second type information element carries unique information of each management frame. A number of information elements in another management frame is reduced. This reduces resource overheads.

In an embodiment of the first aspect or the second aspect, one information element includes an indication field, and the indication field includes a first value or a second value. The first value is used to indicate that the information element is the first type information element, and the second value is used to indicate that the information element is the second type information element. A type of each information element is determined by using the indication field, to ensure that the second station can correctly receive each information element.

In an embodiment of the first aspect or the second aspect, the radio frame includes a temporary starting sequence number, and the temporary starting sequence number is used to indicate a frame sequence of the $1^{st}$ management frame in the at least two management frames.

The temporary starting sequence number indicates that the second station starts, from the $1^{st}$ management frame, acknowledgment on whether the management frames are correctly received.

In an embodiment of the first aspect or the second aspect, the first station receives, on the first link, a response frame sent by the second station. The response frame is a block acknowledgment frame, and a starting sequence number field in the block acknowledgment frame is set to the temporary starting sequence number. The block acknowledgment frame includes a block acknowledgment bitmap, and the block acknowledgment bitmap is used to indicate that the second station starts, from the $1^{st}$ management frame, acknowledgment on whether the at least two management frames are correctly received.

In an embodiment of the first aspect or the second aspect, the second station sends, on the first link, a response frame to the second station. The response frame is a block acknowledgment frame, and a starting sequence number field in the block acknowledgment frame is set to the temporary starting sequence number. The block acknowledgment frame includes a block acknowledgment bitmap, and the block acknowledgment bitmap is used to indicate that the second station starts, from the $1^{st}$ management frame, acknowledgment on whether the at least two management frames are correctly received. The block acknowledgment frame is generated by indicating the starting sequence number field, to determine that the management frame is correctly received.

According to a third aspect, an embodiment of this application provides a multi-link communication method, including: A first station sends, on a first link, an association request frame to a second station, where the first station is one of multiple stations included in a first multi-link device, and the second station is one of multiple stations included in a second multi-link device. The multiple stations included in the first multi-link device work on multiple links, and the multiple links include the first link on which the first station works and a second link on which another station works. The association request frame includes request information of the second link, and the request information includes an index of the second link, an address of a station corresponding to the second link in the first multi-link device, and an identifier of a station corresponding to the second link in the second multi-link device. The first station receives, on the first link, an association response frame sent by the second station, where the association response frame includes response information of the second link. The response information includes the index of the second link, the address of the station corresponding to the second link in the first multi-link device, and the identifier of the station corresponding to the second link in the second multi-link device. In this way, the first station determines, based on the association request frame and the association response frame, that the first station and the second station set up an association relationship on the first link, and that two stations working on the second link set up an association relationship. In addition, the association request frame carries request information of the multiple links, or the association response frame carries response information of the multiple links. This improves communication efficiency.

According to a fourth aspect, an embodiment of this application provides a multi-link communication method, including: A second station receives, on a first link, an association request frame sent by a first station, where the first station is one of multiple stations included in a first multi-link device, and the second station is one of multiple stations included in a second multi-link device. The multiple stations included in the first multi-link device work on multiple links, and the multiple links include the first link on which the second station works and a second link on which another station works. The association request frame includes request information of the second link, and the request information includes an index of the second link, an address of a station corresponding to the second link in the first multi-link device, and an identifier of a station corresponding to the second link in the second multi-link device. The second station sends, on the first link, an association response frame to the first station, where the association response frame includes response information of the second link. The response information includes the index of the second link, the address of the station corresponding to the second link in the first multi-link device, and the identifier of the station corresponding to the second link in the second multi-link device. In this way, the first station determines, based on the association request frame and the association response frame, that the first station and the second station set up an association relationship on the first link, and that two stations working on the second link set up an association relationship. In addition, the association request frame carries request information of the multiple links, or the association response frame carries response information of the multiple links. This improves communication efficiency.

In an embodiment of the third aspect or the fourth aspect, the response information includes a listen interval, and the listen interval is used to indicate a time interval at which the first station receives beacons. It is ensured that the first station can correctly receive the beacons by indicating the listen interval.

In an embodiment of the third aspect or the fourth aspect, the response information includes status code, and the status code is used to indicate whether the second link is successfully associated. The first station determines, by indicating the status code, whether the links are successfully associated.

In an embodiment of the third aspect or the fourth aspect, second configuration information includes a capability element, and the capability element is used to indicate a communication capability of a station corresponding to the second link in the second multi-link device. This ensures that each station meets a communication capability requirement.

According to a fifth aspect, an embodiment of this application provides a multi-link communication method, including: A first station sends, on a first link, a block acknowledgment BA setup request frame to a second station, where the first station is one of multiple stations included in a first multi-link device, and the second station is one of multiple stations included in a second multi-link device. The multiple stations included in the first multi-link device work on multiple links, and the multiple links include the first link on which the first station works. The BA setup request frame includes identification information that is of at least two links and that is used to indicate to request to set up a BA protocol. The first station receives, on the first link, a BA setup response frame sent by the second station, where the BA setup response frame includes the identification information of the at least two links. In this way, the first station determines, based on the BA request frame and the BA setup response frame, that the BA protocol of the at least two links is successfully set up. In addition, the BA request frame or the BA setup response frame carries the identification information of the at least two links, so that the BA protocol of the at least two links can be set up simultaneously. This improves BA protocol setup efficiency, and improves transmission efficiency.

According to a sixth aspect, an embodiment of this application provides a multi-link communication method, including: A second station receives, on a first link, a BA setup request frame sent by a first station, where the first station is one of multiple stations included in a first multi-link device, and the second station is one of multiple stations included in a second multi-link device. The multiple stations included in the second multi-link device work on multiple links, and the multiple links include the first link on which the second station works. The BA setup request frame includes identification information that is of at least two links and that is used to indicate to request to set up a BA protocol. The second station sends, on the first link, a BA setup response frame to the first station, where the BA setup response frame includes the identification information of the at least two links. The first station determines, based on the BA request frame and the BA setup response frame, that the BA protocol of the at least two links is successfully set up. In addition, the BA request frame or the BA setup response frame carries the identification information of the at least two links, so that the BA protocol of the at least two links can be set up simultaneously. This improves BA protocol setup efficiency, and improves transmission efficiency.

In an embodiment of the fifth aspect or the sixth aspect, the identification information includes at least one of a band identifier, a channel number, and an operating class.

In an embodiment of the fifth aspect or the sixth aspect, the BA setup request frame includes a first parameter used to request to set up a BA protocol, and the first parameter includes a service identifier and a reference value of a buffer size. The BA setup response frame includes a second parameter used to determine to set up the BA protocol, and the second parameter includes the service identifier and an acknowledgment value of a buffer size.

In an embodiment of the fifth aspect or the sixth aspect, a transmitter address in the BA setup request frame is a media access control MAC address of any station in the multiple stations in the first multi-link device, and a receiver address in the BA setup request frame is a MAC address of any station in the multiple stations in the second multi-link device. A transmitter address in the BA setup response frame is a MAC address of any station in the multiple stations in the second multi-link device, and a receiver address of the BA setup response frame is a MAC address of any station in the multiple stations in the first multi-link device. MAC addresses of the multiple stations in the first multi-link device are the same, and MAC addresses of the multiple stations in the second multi-link device are the same.

In an embodiment of the fifth aspect or the sixth aspect, a transmitter address in the BA setup request frame is a device address of the first multi-link device, and a receiver address in the BA setup request frame is a device address of the second multi-link device. A transmitter address in the BA setup response frame is the device address of the second multi-link device, and a receiver address in the BA setup response frame is the device address of the first multi-link device.

According to a seventh aspect, an embodiment of this application provides a multi-link communication method, including: A first station sends, on a first link, a TWT setup request frame to a second station, where the first station is one of multiple stations included in a first multi-link device, and the second station is one of multiple stations included in a second multi-link device. The multiple stations included in the second multi-link device work on multiple links, and the multiple links include the first link on which the second station works. The first station receives, on the first link, a TWT setup response frame sent by the second station, where the TWT setup response frame includes identification information of at least two links. In this way, setup of a TWT protocol is simultaneously completed on multiple links between the first multi-link device and the second multi-link device based on the TWT setup request frame and the TWT setup response frame, so that within a time window that is set up, multiple stations corresponding to the multiple links can remain in an active state. In addition, the TWT setup request frame or the TWT setup response frame carries the identification information of the at least two links, so that the TWT protocol of the at least two links can be set up. This improves communication efficiency.

According to an eighth aspect, an embodiment of this application provides a multi-link communication method, including: A second station receives, on a first link, a TWT setup request frame sent by a first station, where the first station is one of multiple stations included in a first multi-link device, and the second station is one of multiple stations included in a second multi-link device. The multiple stations included in the second multi-link device work on multiple links, and the multiple links include the first link on which the second station works. The second station sends, on the first link, a TWT setup response frame to the first station, where the TWT setup response frame includes identification information of at least two links. In this way, setup of a TWT protocol is simultaneously completed on multiple links between the first multi-link device and the second multi-link device based on the TWT setup request frame and the TWT setup response frame, so that within a time window that is set up, multiple stations corresponding to the multiple links can remain in an active state. In addition, the TWT setup request frame or the TWT setup response frame carries the identification information of the at least two links, so that the TWT protocol of the at least two links can be set up. This improves communication efficiency.

According to a ninth aspect, an embodiment of this application provides a first multi-link communication apparatus. The first multi-link communication apparatus is configured to implement the methods and the functions performed by the first multi-link device in the first aspect, the third aspect, the fifth aspect, and the seventh aspect, and is implemented by hardware/software. The hardware/software of the first multi-link communication apparatus includes modules corresponding to the foregoing functions.

According to a tenth aspect, an embodiment of this application provides a second multi-link communication apparatus. The second multi-link device is configured to implement the methods and the functions performed by the second multi-link device in the second aspect, the fourth aspect, the sixth aspect, and the eighth aspect, and is implemented by hardware/software. The hardware/software of the second multi-link communication apparatus includes modules corresponding to the foregoing functions.

According to an eleventh aspect, an embodiment of this application provides a first multi-link device, including a processor, a memory, and a communication bus. The communication bus is configured to implement connection and communication between the processor and the memory. The processor executes a program stored in the memory to implement the steps of the first aspect, the third aspect, the fifth aspect, and the seventh aspect.

In an embodiment, the first multi-link device provided in this application may include a corresponding module configured to perform an action of the first entity in the foregoing method designs. The module may be software and/or hardware.

According to a twelfth aspect, an embodiment of this application provides a second multi-link device, including a processor, a memory, and a communication bus. The communication bus is configured to implement connection and communication between the processor and the memory. The processor executes a program stored in the memory to implement the steps provided in the second aspect, the fourth aspect, the sixth aspect, and the eighth aspect.

In an embodiment, the second multi-link device provided in this application may include a corresponding module configured to perform an action of the first multi-link device in the foregoing method designs. The module may be software and/or hardware.

According to a thirteenth aspect, this application provides a computer-readable storage medium. The computer-readable storage medium stores instructions. When the instructions are run on a computer, the computer is enabled to perform the methods in the foregoing aspects.

According to a fourteenth aspect, this application provides a computer program product including instructions. When the computer program product runs on a computer, the computer is enabled to perform the methods in the foregoing aspects.

According to a fifteenth aspect, a chip is provided. The chip includes a processor, configured to invoke instructions from a memory and run the instructions stored in the memory, so that a communication device on which the chip is installed performs the method according to any one of the foregoing aspects.

According to a sixteenth aspect, an embodiment of this application further provides another chip. The chip may be a chip in a first multi-link device or a second multi-link device. The chip includes an input interface, an output interface, and a processing circuit. The input interface, the output interface, and the circuit are connected to each other through an internal connection path. The processing circuit is configured to perform the method according to any one of the foregoing aspects.

According to a seventeenth aspect, another chip is provided. The chip includes an input interface, an output interface, and a processor. Optionally, the chip further includes a memory. The input interface, the output interface, the processor, and the memory are connected to each other through an internal connection path. The processor is configured to execute code in the memory. When the code is executed, the processor is configured to perform the method according to any one of the foregoing aspects.

According to an eighteenth aspect, an apparatus is provided. The apparatus is configured to implement the method in any one of the foregoing aspects.

BRIEF DESCRIPTION OF DRAWINGS

To describe technical solutions in embodiments of this application or in the background more clearly, the following briefly describes the accompanying drawings for describing the embodiments of this application or the background.

FIG. 8 is a diagram of a structure of a multi-band element according to an embodiment of this application;

FIG. 9 is a diagram of a structure of another frame body field according to an embodiment of this application;

DESCRIPTION OF EMBODIMENTS

The following describes embodiments of this application with reference to the accompanying drawings in the embodiments of this application.

Figure 1:
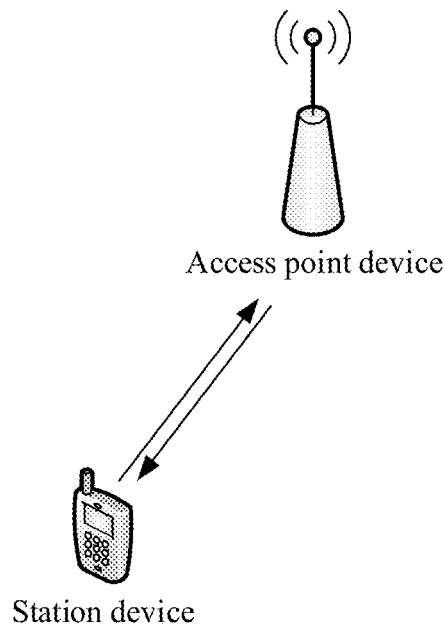
FIG. 1 is a diagram of an architecture of a communication system according to an embodiment of this application.

FIG. 1 is a diagram of an architecture of a communication system according to an embodiment of this application. The communication system includes an access point device and a station device. A multi-link device in embodiments of this application may be a station device, or may be an access point device. If the multi-link device is the access point device, the multi-link device includes one or more access points (APs), and if the multi-link device is the station device, the multi-link device includes one or more stations (STAs). The AP may be an access point used by a mobile user to access a wired network, and is mainly deployed inside a house, a building, and a campus, with a typical coverage radius of tens of meters to hundreds of meters. Certainly, the AP may also be deployed outdoors. The AP is equivalent to a bridge that connects the wired network and a wireless network. A main function of the AP is to connect wireless network clients together, and then connect the wireless network to the Ethernet. The AP may be a terminal device or a network device with a wireless fidelity (Wi-Fi) chip. The AP may be a device that supports the 802.11ax standard. Alternatively, the AP may be a device that supports multiple wireless local area network (WLAN) standards such as 802.11ac, 802.11n, 802.11g, 802.11b, and 802.11a. The STA may be a wireless communication chip, a wireless sensor, or a wireless communication terminal. For example, the STA may be a mobile phone that supports a Wi-Fi communication function, a tablet computer that supports a Wi-Fi communication function, a set top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the STA may support the 802.11ax standard. The STA may also support multiple WLAN standards such as 802.11ac, 802.11n, 802.11g, 802.11b, and 802.11a.

Figure 2:
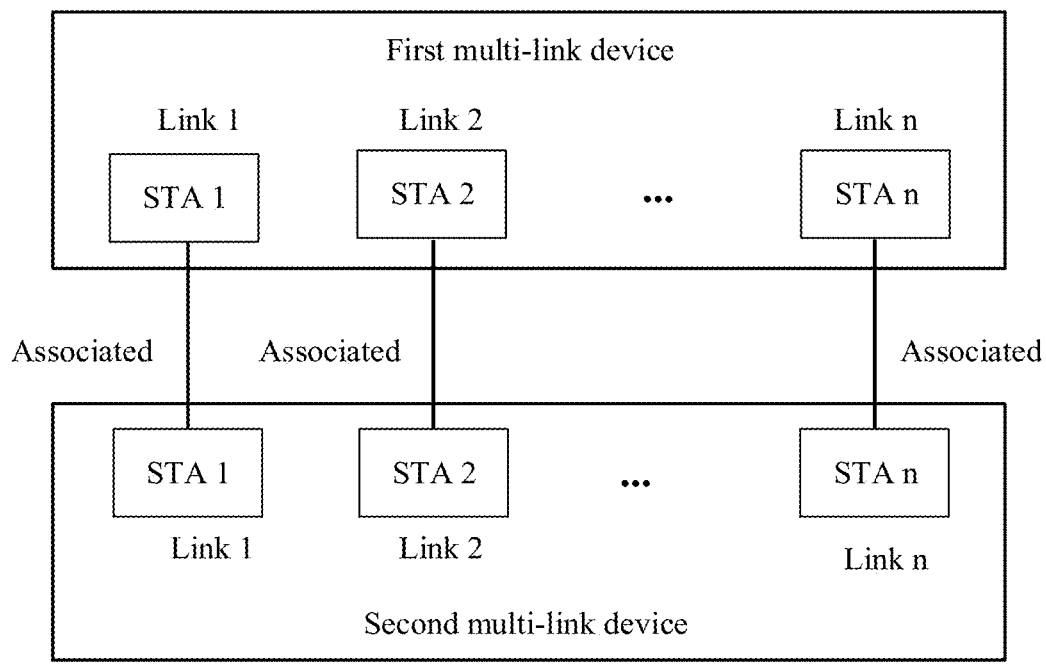
FIG. 2 is a diagram of setting up an association relationship between multi-link devices according to an embodiment of this application.

FIG. 2 is a diagram of setting up an association relationship between multi-link devices according to an embodiment of this application. The multi-link devices shown in FIG. 2 include a first multi-link device and a second multi-link device. The first multi-link device and the second multi-link device may be station devices. Each multi-link device may include multiple stations, and the multiple stations may work on different bands. In this case, the multi-link device may also be referred to as a multi-band device. Alternatively, the multiple stations may work on different channels in a same band. The first multi-link device and the second multi-link device may alternatively be access point devices, which are similar to the station device, and details are not described herein again. If the first multi-link device needs to communicate with the second multi-link device, each station in the first multi-link device needs to be associated with a corresponding station in the second multi-link device. As shown in FIG. 2, a STA 1 in the first multi-link device and a STA 1 in the second multi-link device are associated, and work on a link 1. A STA 2 in the first multi-link device and a STA 2 in the second multi-link device are associated, and work on a link 2. A STA n in the first multi-link device and a STA n in the second multi-link device are associated, and work on a link n. In this way, each station in the first multi-link device may set up a connection to a corresponding station in the second multi-link device on a respective link. This implements multi-link communication between the two multi-link devices.

After the multiple stations of the first multi-link device set up association relationships with the multiple stations of the second multi-link device, if the two multi-link devices need to use an advance feature such as a block acknowledgment (BA) or target wake time (TWT) on multiple links, a corresponding management frame needs to be sent on each of the multiple links to set up a corresponding function.

Figure 3:
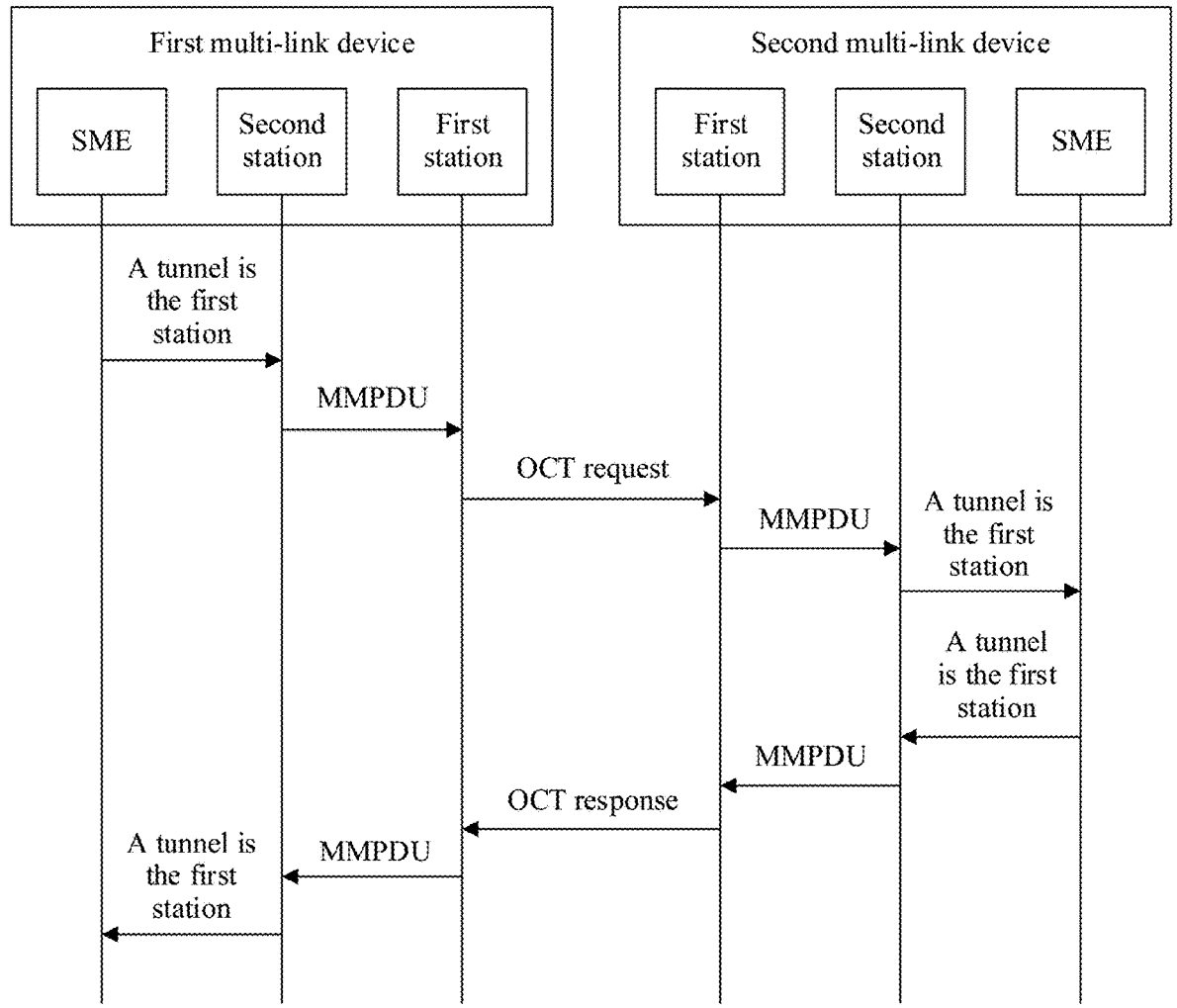
FIG. 3 is a flowchart of sending a management frame according to an embodiment of this application.

FIG. 3 is a flowchart of sending a management frame according to an embodiment of this application. The 802.11 standard defines an on channel tunneling (OCT) mechanism. The OCT mechanism may be applied to a multi-link device. Each multi-link device includes at least two STAs, and the at least two STAs work on different bands. A first multi-link device shown in FIG. 3 includes a first STA and a second STA, and a second multi-link device also includes a first STA and a second STA. The first STA of the first multi-link device and the first STA of the second multi-link device work on a same band to form one link, and the second STA of the first multi-link device and the second STA of the second multi-link device work on a same band to form another link. The second STA in the first multi-link device generates a management MAC protocol data unit (MMPDU), which may also be referred to as a management frame. The first STA sends an OCT request frame on the band on which the first STA works, where the OCT request frame carries the MMPDU generated by the second STA, and the MMPDU may be referred to as an OCT MMPDU. It can be learned from the foregoing process that the multi-link device may send a management frame of one link on another link. However, as a number of links increases, if management frames on multiple links need to be sent, sending of the management frames is time-consuming, and efficiency is low. To resolve the foregoing technical problem, the embodiments of this application provide the following solutions.

Figure 4:
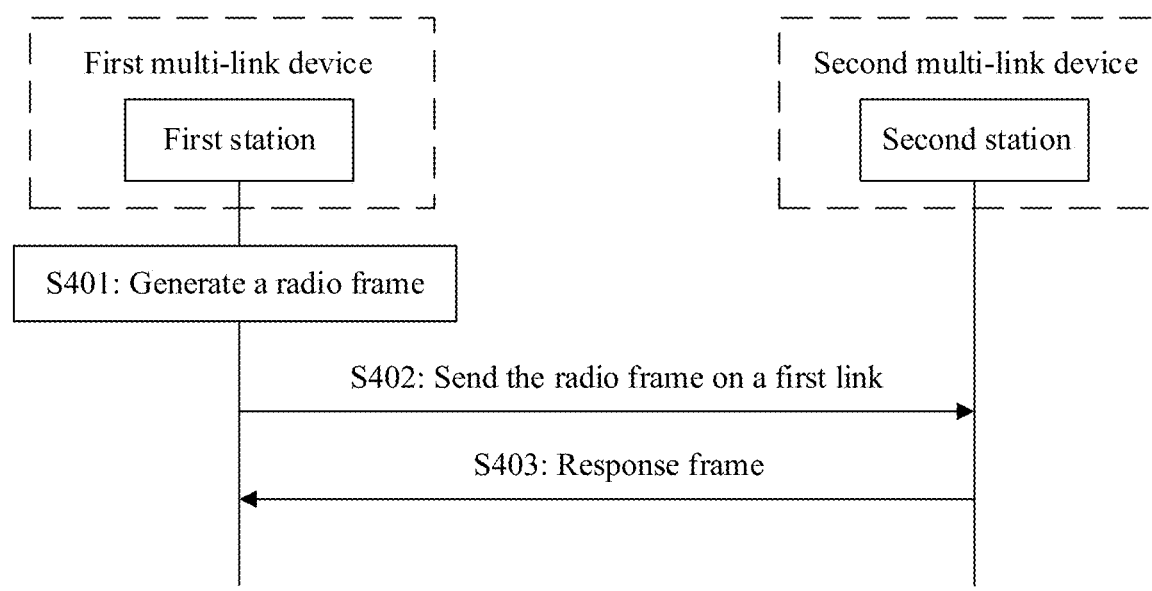
FIG. 4 is a flowchart of a multi-link communication method according to an embodiment of this application.

FIG. 4 is a flowchart of a multi-link communication method according to an embodiment of this application. This embodiment of this application includes at least the following steps.

S401: A first station generates a radio frame, where the first station is one of multiple stations included in a first multi-link device. The multiple stations included in the first multi-link device work on multiple links, and the multiple links include a first link on which the first station works.

It should be noted that a link is determined based on a band on which a station works, or a band and a channel on which a station works. One band may include multiple channels. If the multiple stations work on different bands, the multiple stations work on different links. Alternatively, if the multiple stations work on a same band but on different channels, the multiple stations also work on different links.

S402: The first station sends, on the first link, the radio frame to a second station, and the second station receives, on the first link, the radio frame sent by the first station. The second station is one of multiple stations included in a second multi-link device.

S403: The second station sends, on the first link, a response frame to the first station. The first station receives, on the first link, the response frame sent by the second station. The response frame is a block acknowledgment (BA) frame or a response frame (ACK) frame in response to the radio frame.

Optionally, the at least two management frames are generated by at least two stations that work on different links in the first multi-link device, or may be generated by a same station on different links. The at least two management frames may be generated by the first station in the first multi-link device, or may be generated by another station in the first multi-link device, or may be jointly generated by the first station and another station in the first multi-link device.

Optionally, the at least two management frames may be an association request frame, an association response frame, an authentication frame, a block acknowledgment communication mechanism (add block acknowledgment, ADDBA) request frame, an ADDBA response frame, a TWT request frame, a TWT response frame, and the like.

The radio frame may carry at least two management frames, and the radio frame may be referred to as an on-channel multiple tunneling (OCMT) request frame. If each of the at least two management frames are generated by another station in the first multi-link device other than the first station, the at least two management frames may be referred to as OCT MMPDUs. If the at least two management frames include a management frame generated by the first station, the at least two management frames may be referred to as MMPDUs directly. The radio frame includes a frame header and a frame body. Optionally, the frame body of the radio frame includes at least two pieces of link indication information and the at least two management frames, one piece of link indication information corresponds to one management frame, and the link indication information is used to indicate a link corresponding to the management frame. In an example, the link indication information is a link information element, the link information element includes identification information of the link corresponding to the management frame, and the identification information of the link includes at least one of a band identifier, a channel number, and an operating class. In another example, the link indication information is a multi-band element, and the multi-band element includes a band identifier, a channel number, and an operating class.

Figure 5:
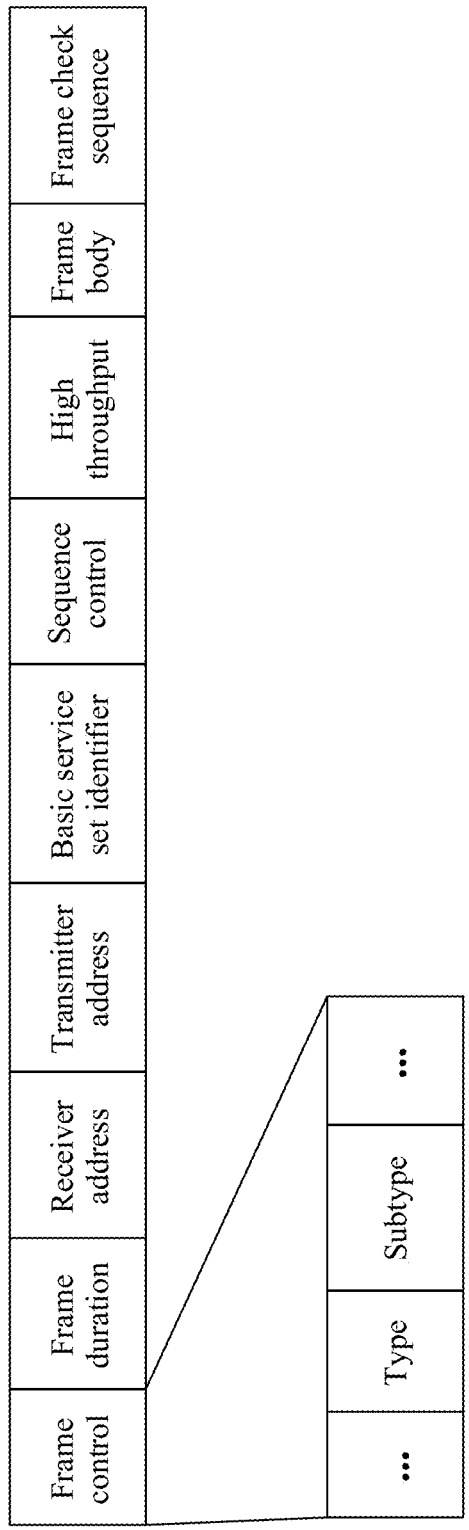
FIG. 5 is a diagram of a structure of a radio frame according to an embodiment of this application.

FIG. 5 is a diagram of a structure of a radio frame according to an embodiment of this application. The radio frame may include a frame control field, a frame duration field, a receiver address (RA) field, a transmitter address (TA) field, and a basic service set identifier (BSSID) field, a sequence control field, a high throughput (HT) control field, a frame body field, and a frame check sequence (FCS) field. The frame control field includes a type field and a subtype field. If the radio frame is an action frame of an extremely high throughput (EHT) type, a value of type in the frame control field is 0, indicating a management frame, and a value of subtype is 13, indicating an action frame. EHT indicates a next generation standard of 802.11ax, such as 802.11be. It should be noted that the radio frame shown in FIG. 5 is merely an example. Certainly, the radio frame may further include other fields. The radio frame may further include only some fields shown in FIG. 5. Locations of the fields may also be adjusted based on a design requirement.

Figures 6, 7:
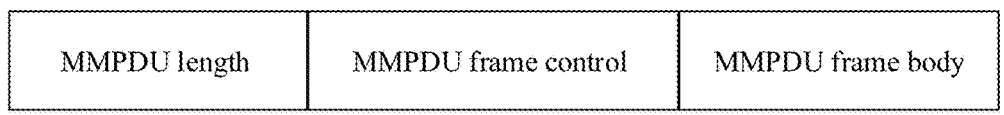
FIG. 6 is a diagram of a structure of a frame body field according to an embodiment of this application.
FIG. 7 is a diagram of a structure of an OCT MMPDU according to an embodiment of this application.

Optionally, the radio frame may include at least two management frames. The at least two management frames are generated by at least two stations that work on different links in the first multi-link device. FIG. 6 is a diagram of a structure of a frame body field according to an embodiment of this application. A frame body field of the radio frame includes at least two OCT MMPDUs, and the at least two OCT MMPDUs are generated by at least two stations that work on different links in the first multi-link device. FIG. 7 is a diagram of a structure of an OCT MMPDU according to an embodiment of this application. Each OCT MMPDU may include an MMPDU length field, an MMPDU frame control field, and an MMPDU frame body field.

Optionally, the frame body field of the radio frame may further include at least two pieces of link indication information, one piece of link indication information corresponds to one management frame, and the link indication information is used to indicate a link corresponding to the management frame. The link indication information may be one or two multi-band elements, and the multi-band element may also be referred to as a multi-link element. One OCT MMPDU may correspond to one multi-band element. For example, a combination thereof is a <OCT MMPDU, multi-band element> field. The multi-band element is used to indicate a band on which the station generating the corresponding OCT MMPDU in the first multi-link device works, or indicate a band and a channel on which the station generating the corresponding OCT MMPDU in the first multi-link device works. Further, as shown in FIG. 6, one OCT MMPDU may alternatively correspond to two multi-band elements, where one multi-band element is carried in a multi-link (multi-band), and the other multi-band element is carried in a multi-link source (multi-band source) element. The multi-band element carried in the multi-band field is used to identify a MAC layer management entity (MLME) of a receive end of the OCT MMPDU. The multi-band element carried in the multi-band source element is used to identify a MAC layer management entity of a generation end of the OCT MMPDU. The description of the multi-link source element is also applicable to other embodiments.

FIG. 8 is a diagram of a structure of a multi-band element according to an embodiment of this application. The multi-band element may include but is not limited to a band identifier (band ID) field, a channel number field, and an operating class field. The multi-band element may further include an element identifier (element ID) field, a length field, a multi-band control field, a beacon interval field, and the like.

In still another example, the link indication information may be a link information element, and a number of link information elements is the same as a number of OCT MMPDUs. One link information element corresponds to one OCT MMPDU. For example, a combination thereof is a <OCT MMPDU, link information element> field. The link information element includes identification information of the link corresponding to the management frame, and the identification information of the link includes at least one of a band identifier, a channel number, and an operating class.

Optionally, the frame body field of the radio frame may further include a category field, and a value of the category field is used to indicate that a next field is an EHT action frame. A value of the EHT action field is used to indicate that the radio frame is an OCMT request.

Optionally, the frame body field of the radio frame may further include first indication information, and the first indication information is used to indicate a number of the at least two management frames (number of OCT MMPDUs). Alternatively, the radio frame includes second indication information, and the second indication information is used to indicate a total length of the at least two management frames and the at least two pieces of link indication information. FIG. 9 is a diagram of a structure of another frame body field according to an embodiment of this application. The frame body field includes a total length field, and other fields included in the frame body field are the same as fields in the frame body field shown in FIG. 6.

Figures 10, 11:
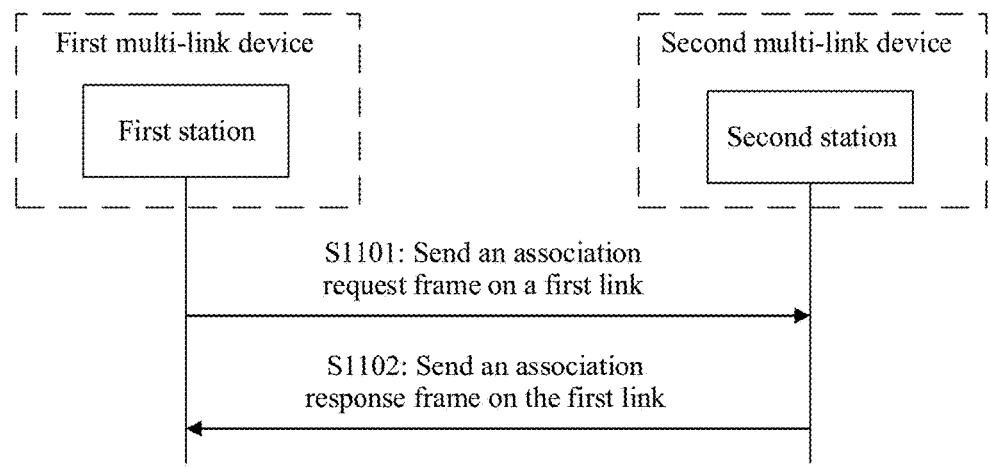
FIG. 10 is a diagram of a structure of still another frame body field according to an embodiment of this application.
FIG. 11 is a flowchart of another multi-link communication method according to an embodiment of this application.

Optionally, the frame body field of the radio frame may include at least two cyclic redundancy check (CRC) fields, one cyclic redundancy check field corresponds to one management frame, and the cyclic redundancy check field is used to check correctness of the management frame and the link indication information. FIG. 10 is a diagram of a structure of still another frame body field according to an embodiment of this application. The frame body field of the radio frame may include an OCT MMPDU and a multi-band element, and may further include a CRC field. For example, a combination thereof is a <OCT MMPDU, multi-band element, CRC> field. Optionally, the frame body field of the radio frame may further include a temporary starting sequence number field, and the temporary starting sequence number is used to indicate a frame sequence of a $1^{st}$ management frame in the at least two management frames.

Optionally, when frame types and subtypes of the at least two management frames are the same, the at least two management frames include the $1^{st}$ management frame and another management frame other than the $1^{st}$ management frame. The $1^{st}$ management frame includes a first type information element (IE) and a second type information element, the another management frame includes the second type information element, the first type information element carries common information of the at least two management frames, and the second type information element carries unique information of each management frame.

For example, the frame body field of the radio frame includes two management frames, a $1^{st}$ management frame includes 20 information elements, and a $2^{nd}$ management frame also includes 20 information elements. The first 10 information elements in the $1^{st}$ management frame and the first 10 information elements in the $2^{nd}$ management frame are the same, and are common information of the $1^{st}$ management frame and the $2^{nd}$ management frame. Therefore, the first 10 information elements in the $1^{st}$ management frame and the first 10 information elements in the $2^{nd}$ management frame are first type information elements. The last 10 information elements in the $1^{st}$ management frame and the last 10 information elements in the $2^{nd}$ management frame are different, and are unique information of each of the $1^{st}$ management frame and the $2^{nd}$ management frame. Therefore, the last 10 information elements in the $1^{st}$ management frame and the last 10 information elements in the $2^{nd}$ management frame are second type information elements. In this embodiment of this application, the two management frames may be optimized, to reduce transmission overheads. Common information in the management frames is placed in the $1^{st}$ management frame, and another management frame carries only unique information of each management frame. In an implementation, the $1^{st}$ management frame includes first type information elements and second type information elements, the first type information elements are the first 10 information elements in the $1^{st}$ management frame, and the second type information elements are the last 10 information elements in the $1^{st}$ management frame. The $2^{nd}$ management frame includes only second type information elements, and the second type information elements are the last 10 information elements in the $2^{nd}$ management frame. The second station of the second multi-link device may first receive the $1^{st}$ management frame, then receive the $2^{nd}$ management frame, and add the first 10 information elements of the $1^{st}$ management frame to the $2^{nd}$ management frame. In this way, the second station may obtain all 20 information elements, to obtain complete information.

Further, one information element includes an indication field, the indication field includes a first value or a second value, the first value is used to indicate that the information element is the first type information element, and the second value is used to indicate that the information element is the second type information element. Alternatively, the first value is used to indicate that the information element is the second type information element, and the second value is used to indicate that the information element is the first type information element. The indication field may be an element identifier (element ID) of each information element. Optionally, when the frame body field of the radio frame includes the temporary starting sequence number, the second station may reply with a block acknowledgment frame, where a starting sequence number field in the block acknowledgment frame is set to the temporary starting sequence number. The second station may start, from the $1^{st}$ management frame, acknowledgment on whether the at least two management frames are correctly received. The second station sequentially determines the at least two management frames, and a bitmap is finally formed. A $1^{st}$ bit in the bitmap is used to indicate whether the $1^{st}$ management frame in the radio frame is correctly received, and other bits indicate whether the $2^{nd}$ management frame, a 3rd management frame, . . . , and an $N^{th}$ management frame are correct. In addition, the frame body of the radio frame may not include the temporary starting sequence number field. When replying with the block acknowledgment frame, the second station may set the starting sequence number field in the block acknowledgment frame to a predefined value or any value, and start, from the predefined value or the any value, acknowledgment on whether the management frames are correctly received.

In this embodiment of this application, one radio frame carries at least two management frames generated by at least two stations on different links. In this way, management frames of multiple links are sent. This reduces a delay, and improves communication efficiency.

FIG. 11 is a flowchart of another multi-link communication method according to an embodiment of this application. This embodiment of this application includes at least the following steps.

S1101: A first station sends, on a first link, an association request frame to a second station. The second station receives, on the first link, the association request frame sent by the first station. The first station is one of multiple stations included in a first multi-link device, and the second station is one of multiple stations included in a second multi-link device. The multiple stations included in the first multi-link device work on multiple links, and the multiple links include the first link on which the first station and the second station work and a second link on which another station works.

S1102: The second station sends, on the first link, an association response frame to the first station. The first station receives, on the first link, the association response frame sent by the second station.

The association request frame is a management frame generated by the first station, the association request frame includes request information of at least two links, and the request information of the at least two links is generated by at least two stations that work on different links in the first multi-link device. Further, the request information of the at least two links may be jointly generated by the first station corresponding to the first link in the first multi-link device and another station corresponding to the second link and in the first multi-link device. Because the association request frame is transmitted on the first link, the first link is a transmission link, and the second link is a non-transmission link.

The association request frame includes a multi-link element of the first link, and the multi-link element of the first link is generated by the first station corresponding to the first link in the first multi-link device. The multi-link element of the first link includes request information of the first link, and the request information of the first link may include an index of the first link, an address of the first station corresponding to the first link in the first multi-link device, and an identifier of a second station corresponding to the first link in the second multi-link device.

In this embodiment of this application, a multi-link element of the second link is newly added to the association request frame, and the multi-link element of the second link is generated by a station corresponding to the second link in the first multi-link device. The second link may be one or more links in the multiple links other than the first link.

Figure 12:
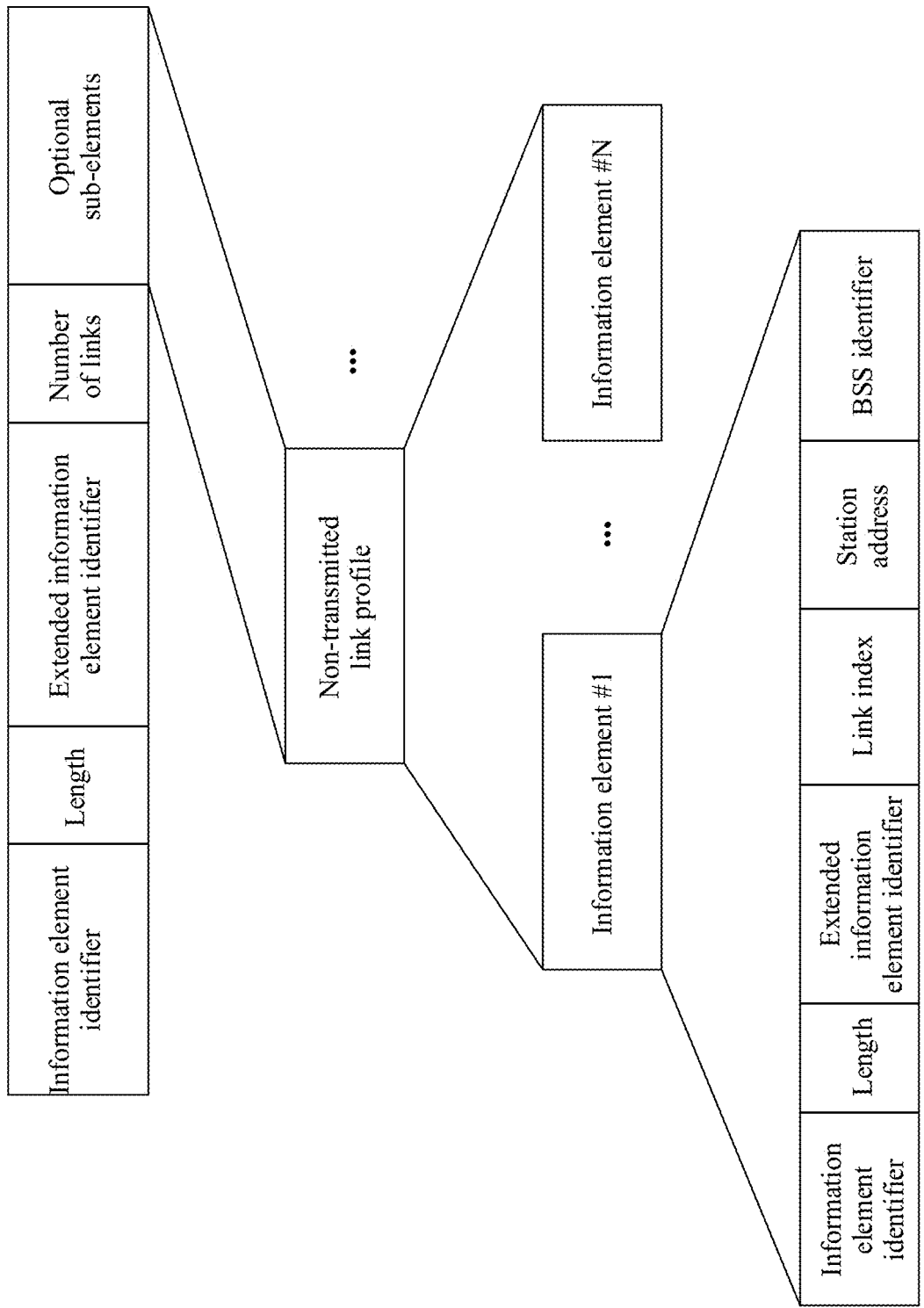
FIG. 12 is a diagram of a structure of a multi-link element of a second link in an association request frame according to an embodiment of this application.

FIG. 12 is a diagram of a structure of the multi-link element of the second link in the association request frame according to an embodiment of this application. The multi-link element of the second link includes an information element identifier (element ID) field, a length field, an extended information element identifier (element ID Extension) field, a number of links field, and an optional sub-element field. The number of links is used to indicate a number of links on which a station in the first multi-link device sets up an association relationship with a station in the second multi-link device.

As shown in FIG. 12, the optional sub-element may include one or more non-transmitted link profiles, namely, response information of one or more pieces of second links. The non-transmitted link profiles may be identified by using a predefined value, for example, 0. One non-transmitted link profile may include N information elements, and N is an integer greater than or equal to 1. A $1^{st}$ information element is a newly defined information element, and is used to identify the non-transmitted link profile. A $2^{nd}$ information element to an $N^{th}$ information element are corresponding information elements that indicate a change in content in an information element list of the first link (transmission link). Further, the $1^{st}$ information element may include a link index field of the second link, an address of station (STA's address) field, and a basic service set (BSS) identifier (BSSID), where the station corresponds to the second link in the first multi-link device, and the station corresponding to the second link in the first multi-link device expects to be associated with the basic service set. The request information of the second link may further include an information element identifier (element ID) field, a length field, and an extended information element identifier (element ID extension) field that are of a multi-link index element.

Optionally, the multi-link element of the first link may include an information element (IE) corresponding to the first link, and the non-transmitted link profile in the multi-link element of the second link may include an information element corresponding to the second link. The information element corresponding to the first link includes a first type information element and a second type information element, and the information element corresponding to the second link includes only the second type information element. The first type information element carries common information of the information element corresponding to the first link and the information element corresponding to the second link. The second type information element carries unique information of each of the information element corresponding to the first link and the information element corresponding to the second link. The second station of the second multi-link device may first receive the information element corresponding to the first link, then receive the information element corresponding to the second link, and then add the same common information to the information element corresponding to the second link, to obtain all information elements of the non-transmission link.

Optionally, the non-transmitted link profile may further include a non-transmitted BSSID capability element, and the capability element is used to indicate a communication capability of the station corresponding to the second link in the first multi-link device. The station corresponding to the second link in the first multi-link device may be a directional multiple-gigabit station (DMG STA), which is also a type of high-frequency station.

Optionally, a service set identifier (S SID) and an association identifier (AID) of the second link are the same as an SSID and an AID of the first link.

The association response frame is a management frame generated by the second station, the association response frame includes response information of at least two links, and the response information of the at least two links is generated by at least two stations that work on different links in the second multi-link device. Further, the response information of the at least two links may be jointly generated by the second station corresponding to the first link in the second multi-link device and another station corresponding to the second link in the second multi-link device.

The association response frame includes response information of the second link, and the response information includes an index of the second link, an address of the station corresponding to the second link in the first multi-link device, and an identifier of the station corresponding to the second link in the second multi-link device. The response information of the second link may include a listen interval field, and the listen interval is used to indicate a time interval at which the first station receives beacons. The non-transmitted link profile may further include a status code field, and the status code is used to indicate whether the second link is successfully associated.

Figure 13:
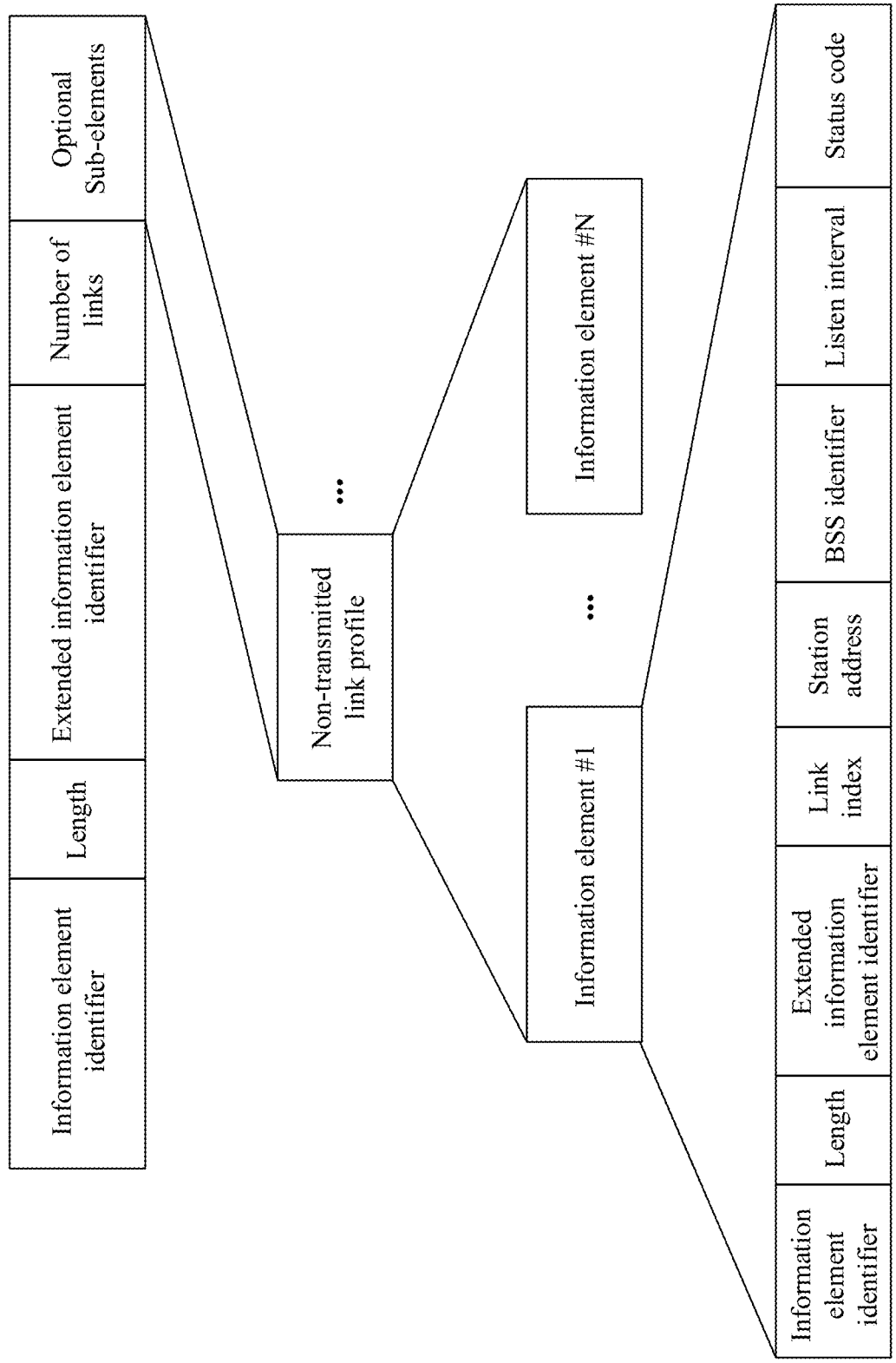
FIG. 13 is a diagram of a structure of a multi-link element of a second link in an association response frame according to an embodiment of this application.

FIG. 13 is a diagram of a structure of a multi-link element of the second link in the association response frame according to an embodiment of this application. A frame structure of the association response frame is similar to a frame structure of the association request frame. For content and functions of elements or fields included in the association response frame, refer to content and functions of elements or fields included in the foregoing association request frame. Details are not described again in this embodiment of this application.

In this embodiment of this application, the first station may determine, based on the association request frame and the association response frame, that the first station and the second station set up an association relationship on the first link, and that two stations working on the second link set up an association relationship. In addition, the association request frame carries request information of multiple links, or the association response frame carries response information of multiple links, so that association relationships of the multiple links can be set up simultaneously. This improves communication efficiency. In this embodiment of this application, the first station sets up a BA protocol with the second station, and the BA protocol that is set up may be used for communication between the multiple stations in the multi-link device in which the first station is located and the multiple stations in the multi-link device in which the second station is located. The communication may be multi-link aggregation communication.

Figures 14, 15:
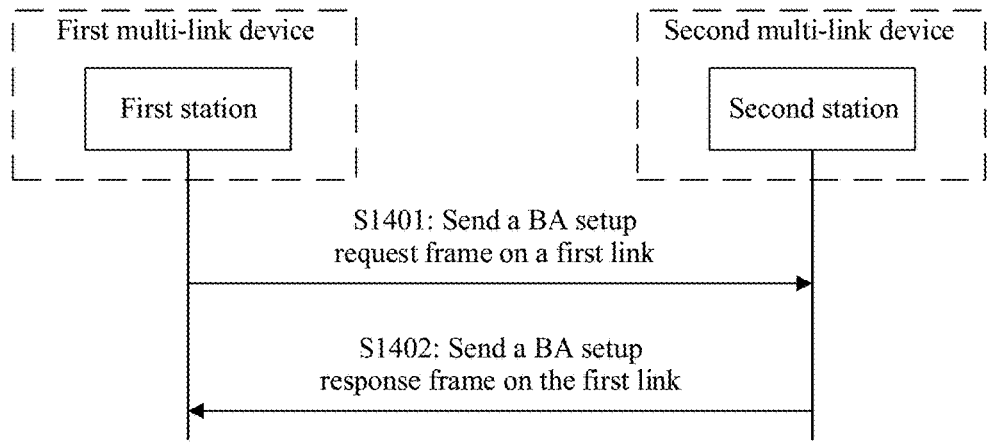
FIG. 14 is a flowchart of another multi-link communication method according to an embodiment of this application.
FIG. 15 is a diagram of a structure of a BA setup request frame or a BA setup response frame according to an embodiment of this application.

FIG. 14 is a flowchart of another multi-link communication method according to an embodiment of this application. This embodiment of this application includes at least the following steps.

S1401: A first station sends, on a first link, a block acknowledgment BA setup request frame to a second station. The second station receives, on the first link, the BA setup request frame sent by the first station. The first station is one of multiple stations included in a first multi-link device, and the second station is one of multiple stations included in a second multi-link device. The multiple stations included in the first multi-link device work on multiple links, and the multiple links include the first link on which the first station and the second station work.

S1402: The second station sends, on the first link, a BA setup response frame to the first station. The first station receives, on the first link, the BA setup response frame sent by the second station, where the BA setup response frame includes identification information of at least two links.

The BA setup request frame includes the identification information that is of the at least two links and that is used to indicate to request to set up a BA protocol. The identification information of the at least two links may include identification information of the first link and identification information of one or more second links in the multiple links. The identification information of the at least two links may alternatively include identification information of multiple second links in the multiple links other than the first link. The identification information includes at least one of a band identifier, a channel number, and an operating class.

FIG. 15 is a diagram of a structure of the BA setup request frame or the BA setup response frame according to an embodiment of this application. The BA setup request frame may include a category field, a block acknowledgment action (block ACK action) field, a dialog token field, a block acknowledgment parameter set (block ACK parameter set) field, a block acknowledgment timeout value (block ACK timeout value) field, a block acknowledgment starting sequence control (block ACK starting sequence control) field, and a multi-link element field. The dialog token is used to identify the BA setup request frame, the block acknowledgment parameter set is parameters of the BA protocol, and the block acknowledgment timeout value is used to indicate a time period for setting up the BA protocol. The multi-link element may also be referred to as a multi-band element.

It should be noted that the BA setup request frame may include a multi-link element of one second link other than the first link in the multiple links. In this case, the BA protocol may be applied to the first link and the second link. The BA setup request frame may alternatively include multi-link elements of multiple second links in the multiple links other than the first link. In this case, the BA protocol may be applied to the first link and the multiple second links, or may be applied to only the multiple second links. Certainly, the BA setup request frame may alternatively include a multi-link element of the first link and multi-link elements of multiple second links. For example, when the BA setup request frame includes multi-link elements of the first link, the second link, . . . , and an $N^{th}$ link, the BA protocol that is set up may be used for communication on the first link, the second link, . . . , and the $N^{th}$ link, or may be used for aggregation communication on multiple links of the first link, the second link, . . . , and the $N^{th}$ link. In this case, the multiple links share a same BA protocol.

Optionally, one multi-link element may include indication information, and the indication information is used to indicate to set up a BA protocol on a link corresponding to the multi-link element. If the multi-link element does not carry the indication information, the BA protocol may alternatively be set up on the link corresponding to the multi-link element by default.

The BA setup request frame may include a first parameter used to request to set up a BA protocol, and the first parameter includes a service identifier and a reference value of a buffer size. The BA protocol may be uniquely identified by a triplet <transmitter address (TA), receiver address (RA), service identifier>, and the triplet is carried in a frame header part of the BA setup request frame. MAC addresses of the multiple stations in the first multi-link device may be set to a same value, and MAC addresses of the multiple stations in the second multi-link device may also be set to a same value. The transmitter address in the BA setup request frame is a media access control MAC address of any station in the multiple stations in the first multi-link device, and the receiver address in the BA setup request frame is a MAC address of any station in the multiple stations in the second multi-link device. The MAC addresses of the multiple stations in the first multi-link device are the same, and the MAC addresses of the multiple stations in the second multi-link device are the same.

Optionally, when MAC addresses of multiple stations in the first multi-link device and the second multi-link device are all different, a device address of the first multi-link device and a device address of the second multi-link device need to be defined. The device addresses may be multi-link logical entity addresses, and the device addresses may be known in advance by the multiple stations in the first multi-link device, or known in advance by the multiple stations in the second multi-link device. A station in the first multi-link device may send the device address of the first multi-link device to a station in the second multi-link device, and a station in the second multi-link device may send the device address of the second multi-link device to a station in the first multi-link device. The transmitter address in the BA setup request frame is the device address of the first multi-link device, and the receiver address in the BA setup request frame is the device address of the second multi-link device.

When the MAC addresses of the multiple stations in the first multi-link device and the second multi-link device are all different, a MAC address of the first station may be carried in the transmitter address in the frame header part of the BA setup request frame, and the device addresses are carried in a frame body in the BA setup request frame. When sending the BA setup request frame, the first multi-link device uses the device address of the first multi-link device as the transmitter address of the BA setup request frame, and uses the device address of the second multi-link device as the receiver address of the BA setup request frame. Alternatively, the transmitter address in the frame header part of the BA setup request frame may be set to the device address of the first multi-link device, and the receiver address may be set to the device address of the second multi-link device.

Optionally, the first multi-link device may send the device address of the first multi-link device to the second multi-link device by using a probe request frame, an association request frame, and a re-association request frame. The second multi-link device may send the device address of the second multi-link device to the first multi-link device by using a beacon frame, a probe response frame, an association response frame, and a re-association response frame. Therefore, the first multi-link device or the second multi-link device learns the device address of the first multi-link device and the device address of the second multi-link device.

The BA setup response frame includes identification information that is of at least two links and that is used to indicate to determine to set up a BA protocol. The identification information of the at least two links may include identification information of the first link in the multiple links and identification information of the second link in the multiple links. The identification information of the at least two links may alternatively include identification information of multiple second links in the multiple links other than the first link. The identification information includes at least one of a band identifier, a channel number, and an operating class.

Optionally, the BA setup response frame may include a second parameter used to determine to set up the BA protocol, and the second parameter includes the service identifier and an acknowledgment value of the buffer size. Optionally, a transmitter address in the BA setup response frame is a MAC address of any station in the multiple stations in the second multi-link device, and a receiver address of the BA setup response frame is a MAC address of any station in the multiple stations in the first multi-link device. The MAC addresses of the multiple stations in the first multi-link device are the same, and the MAC addresses of the multiple stations in the second multi-link device are the same. Optionally, the transmitter address in the BA setup response frame is the device address of the second multi-link device, and the receiver address in the BA setup response frame is the device address of the first multi-link device.

It should be noted that the BA setup response frame may include a multi-link element of one second link other than the first link in the multiple links. In this case, the BA protocol may be applied to the first link and the second link. The BA setup response frame may alternatively include multi-link elements of multiple second links in the multiple links other than the first link. In this case, the BA protocol may be applied to the first link and the multiple second links, or may be applied to only the multiple second links. Certainly, the BA setup response frame may alternatively include a multi-link element of the first link and multi-link elements of multiple second links.

Optionally, when the MAC addresses of the multiple stations in the first multi-link device and the second multi-link device are all different, the transmitter address in the BA setup response frame is the device address of the second multi-link device, and the receiver address in the BA setup response frame is the device address of the first multi-link device.

Optionally, when the MAC addresses of the multiple stations in the first multi-link device and the second multi-link device are all different, a MAC address of the second station may be carried in the transmitter address in a frame header part of the BA setup response frame, and the device addresses are carried in a frame body in the BA setup response frame. When sending the BA setup response frame, the second multi-link device uses the device address of the second multi-link device as the transmitter address of the BA setup response frame, and uses the device address of the first multi-link device as the receiver address of the BA setup response frame. Alternatively, the transmitter address in the frame header part of the BA setup response frame may be set to the device address of the second multi-link device, and the receiver address may be set to the device address of the first multi-link device.

The BA setup response frame corresponds to the BA setup request frame.

A frame structure of the BA setup response frame is similar to a frame structure of the BA setup request frame. For content and functions of elements or fields included in the BA setup response frame, refer to content and functions of elements or fields included in the foregoing BA setup request frame. Details are not described again in this embodiment of this application.

Optionally, after the BA protocol of the at least two links is successfully set up, the first station may send, on the first link, a BA deletion (DELBA) request frame to the second station, and the second station receives, on the first link, the BA deletion request frame sent by the first station. The BA deletion request frame may include identification information that is of at least two links and that indicates to request to delete the BA protocol. Then, the second station sends, on the first link, a BA deletion response frame to the first station, and the first station may receive, on the first link, the BA deletion response frame sent by the second station, where the BA deletion response frame includes the identification information that is of the at least two links and that is used to determine to delete the BA protocol. One implementation is similar to the foregoing method for setting up the BA protocol, and details are not described in this embodiment of this application.

In this embodiment of this application, the first station determines, based on the BA request frame and the BA setup response frame, that the BA protocol of the at least two links is successfully set up. In addition, the BA request frame or the BA setup response frame carries the identification information of the at least two links, so that the BA protocol of the at least two links can be set up simultaneously. This improves BA protocol setup efficiency, and improves transmission efficiency.

Figure 16:
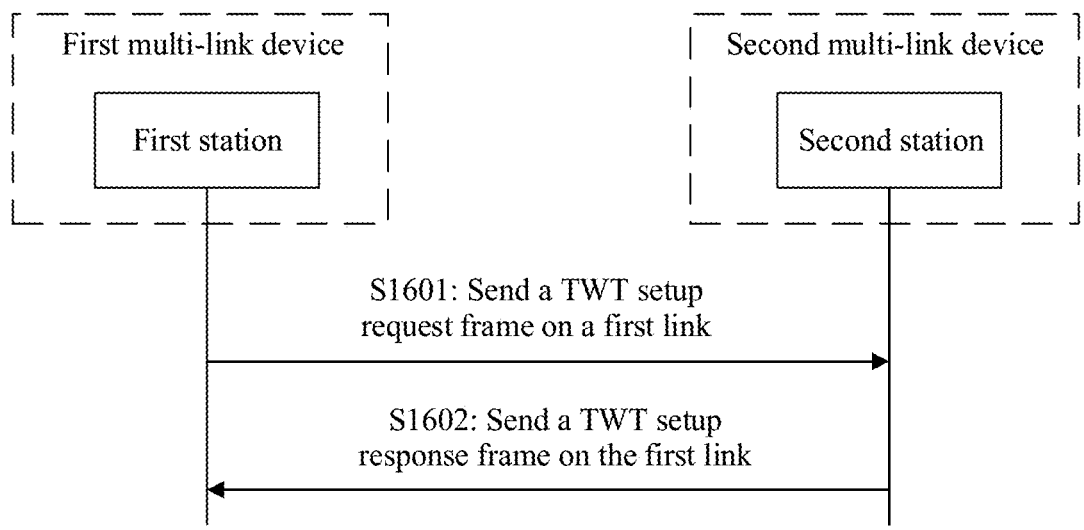
FIG. 16 is a flowchart of another multi-link communication method according to an embodiment of this application.

FIG. 16 is a flowchart of another multi-link communication method according to an embodiment of this application. This embodiment of this application includes at least the following steps.

S1601: A first station sends, on a first link, a TWT setup request frame to a second station. The second station receives, on the first link, the TWT setup request frame sent by the first station, where the first station is one of multiple stations included in a first multi-link device, the second station is one of multiple stations included in a second multi-link device, the multiple stations included in the second multi-link device work on multiple links, and the multiple links include the first link on which the second station works.

S1602: The second station sends, on the first link, a TWT setup response frame to the first station. The first station receives, on the first link, the TWT setup response frame sent by the second station, where the TWT setup response frame includes identification information of at least two links.

The TWT setup request frame includes the identification information that is of the at least two links and that is used to indicate to request to set up a TWT protocol. The identification information of the at least two links may include identification information of the first link and identification information of one or more second links in the multiple links. The identification information of the at least two links may alternatively include identification information of multiple second links in the multiple links other than the first link. The identification information includes at least one of a band identifier, a channel number, and an operating class.

The TWT setup response frame includes the identification information that is of the at least two links and that is used to indicate to determine to set up the TWT protocol. The identification information of the at least two links may include identification information of the first link in the multiple links and identification information of the second link in the multiple links. The identification information of the at least two links may alternatively include identification information of multiple second links in the multiple links other than the first link. The identification information includes at least one of a band identifier, a channel number, and an operating class.

Figure 17:
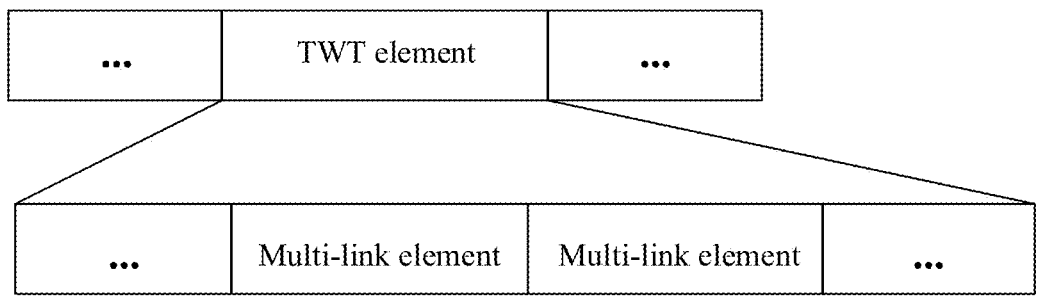
FIG. 17 is a diagram of a structure of a TWT setup request frame or a TWT setup response frame according to an embodiment of this application.

FIG. 17 is a diagram of a structure of the TWT setup request frame or the TWT setup response frame according to an embodiment of this application. The TWT setup request frame may include a TWT element, and the TWT element may include a multi-link element of one second link other than the first link in the multiple links. In this case, the TWT protocol may be applied to the first link and the second link. The TWT element may alternatively include multi-link elements of multiple second links in the multiple links other than the first link. In this case, the TWT protocol may be applied to the first link and the multiple second links, or may be applied to only the multiple second links. Certainly, the TWT element may alternatively include a multi-link element of the first link and multi-link elements of multiple second links.

The TWT setup response frame corresponds to information included in the TWT setup request frame. A frame structure of the TWT setup response frame is similar to a frame structure of the TWT setup request frame. For content and functions of elements or fields included in the TWT setup response frame, refer to content and functions of elements or fields included in the foregoing TWT setup request frame. Details are not described again in this embodiment of this application.

Finally, the first station may determine, based on the TWT request frame and the TWT setup response frame, that the TWT protocol of the at least two links is successfully set up. In this way, setup of a TWT protocol is simultaneously completed on multiple links between the first multi-link device and the second multi-link device, so that within a time window that is set up, multiple stations corresponding to the multiple links can remain in an active state. This embodiment of this application is similar to the foregoing embodiments, and details are not described again in this embodiment of this application.

In actual application, the foregoing several embodiments may be independently performed, or may be associated with each other, and may be performed in a sequence of communication processes. For example, an association relationship may be first set up between the first multi-link device and the second multi-link device, then a BA protocol is set up, and finally a TWT protocol is set up. In the foregoing communication manner of the management frame, the association relationship, the BA protocol, and the TWT protocol are set up between the first multi-link device and the second multi-link device.

The foregoing describes in detail the methods in the embodiments of this application. The following provides apparatuses in the embodiments of this application.

Figure 18:
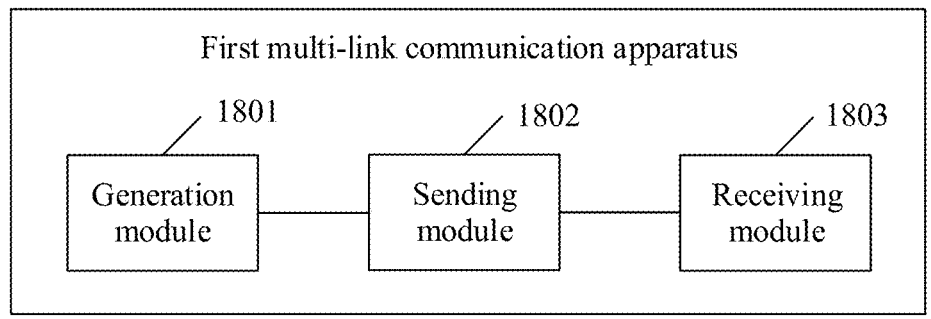
FIG. 18 is a diagram of a structure of a first multi-link communication apparatus according to an embodiment of this application.

FIG. 18 is a diagram of a structure of a first multi-link communication apparatus according to an embodiment of this application. The first multi-link communication apparatus may be configured to implement any method and function related to the first multi-link communication apparatus in any of the foregoing embodiments. The first multi-link communication apparatus may include a generation module 1801, a sending module 1802, and a receiving module 1803. Optionally, the generation module 1801, the sending module 1802, and the receiving module 1803 may be modules in the first station, and the sending module 1802 and the receiving module 1803 are respectively corresponding to one baseband circuit and one radio frequency circuit included in the first station. Detailed descriptions of the modules are as follows.

In an embodiment:

The generation module 1801 is configured to generate a radio frame via a first station, where the first station is one of multiple stations included in a first multi-link device.

The multiple stations included in the first multi-link device work on multiple links, and the multiple links include a first link on which the first station works.

The sending module 1802 is configured to send, on the first link via the first station, the radio frame to a second station, where the radio frame includes at least two management frames, the at least two management frames are generated by at least two stations that work on different links in the first multi-link device, and the second station is one of multiple stations included in a second multi-link device.

For content and functions of elements or fields included in the radio frame, refer to descriptions in the foregoing method embodiments. Details are not described herein again.

Optionally, the receiving module 1803 is configured to receive, on the first link via the first station, a response frame sent by the second station.

The response frame is a block acknowledgment frame, a starting sequence number field in the block acknowledgment frame is set to a temporary starting sequence number, the block acknowledgment frame includes a block acknowledgment bitmap, and the block acknowledgment bitmap is used to indicate that the second station starts, from the $1^{st}$ management frame, acknowledgment on whether the at least two management frames are correctly received.

In another embodiment:

The sending module 1802 is configured to send, on a first link via a first station, a block acknowledgment BA setup request frame to a second station, where the first station is one of multiple stations included in a first multi-link device, and the second station is one of multiple stations included in a second multi-link device. The multiple stations included in the first multi-link device work on multiple links, and the multiple links include the first link on which the first station works.

The BA setup request frame includes identification information that is of at least two links and that is used to indicate to request to set up a BA protocol.

The receiving module 1803 is configured to receive, on the first link via the first station, a BA setup response frame sent by the second station, where the BA setup response frame includes the identification information of the at least two links.

For content and functions of elements or fields included in the BA setup request frame and the BA setup response frame, refer to descriptions in the foregoing method embodiments. Details are not described herein again.

In another embodiment:

The sending module 1802 is configured to send, on a first link via a first station, an association request frame to a second station, where the first station is one of multiple stations included in a first multi-link device, and the second station is one of multiple stations included in a second multi-link device. The multiple stations included in the first multi-link device work on multiple links, and the multiple links include the first link on which the first station works and a second link on which another station works.

The association request frame includes request information of the second link, and the second link in the first multi-link device, and an identifier of a station corresponding to the second link in the second multi-link device.

The receiving module 1803 is configured to receive, on the first link via the first station, an association response frame sent by the second station, where the association response frame includes response information of the second link. The response information includes the index of the second link, the address of the station corresponding to the second link in the first multi-link device, and the identifier of the station corresponding to the second link in the second multi-link device.

For content and functions of elements or fields included in the association request frame and the association response frame, refer to descriptions in the foregoing method embodiments. Details are not described herein again.

It should be noted that, for implementation of the modules, refer to corresponding descriptions in the method embodiments shown in FIG. 4, FIG. 11, FIG. 14, and FIG. 16, to perform the methods and the functions performed by the first multi-link device in the foregoing embodiments.

Figure 19:
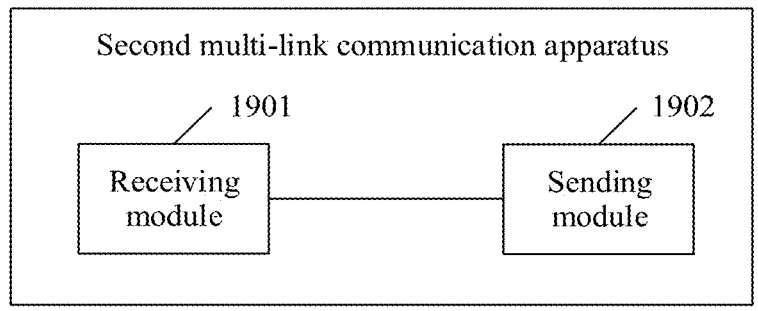
FIG. 19 is a diagram of a structure of a second multi-link communication apparatus according to an embodiment of this application.

FIG. 19 is a diagram of a structure of a second multi-link communication apparatus according to an embodiment of this application. The second multi-link communication apparatus may be configured to implement any method and function related to the second multi-link communication apparatus in any of the foregoing embodiments. The second multi-link communication apparatus may include a receiving module 1901 and a sending module 1902. Optionally, the receiving module 1901 and the sending module 1902 may be modules in the second station, and the receiving module 1901 and the sending module 1902 are respectively corresponding to one baseband circuit and one radio frequency circuit included in the second station. Detailed descriptions of the modules are as follows.

The receiving module 1901 is configured to receive, on a first link via a second station, a radio frame sent by a first station, where the first station is one of multiple stations included in a first multi-link device, and the second station is one of multiple stations included in a second multi-link device. The multiple stations included in the second multi-link device work on multiple links, and the multiple links include the first link on which the second station works. The radio frame includes at least two management frames, and the at least two management frames are generated by at least two stations that work on different links in the first multi-link device.

For content and functions of elements or fields included in the radio frame, refer to descriptions in the foregoing method embodiments. Details are not described herein again.

The sending module 1902 is configured to send, on the first link via the second station, a response frame to the second station.

The response frame is a block acknowledgment frame, a starting sequence number field in the block acknowledgment frame is set to a temporary starting sequence number, the block acknowledgment frame includes a block acknowledgment bitmap, and the block acknowledgment bitmap is used to indicate that the second station starts, from the 1$^{st}$ management frame, acknowledgment on whether the at least two management frames are correctly received.

In another embodiment:

The receiving module 1901 is configured to receive, on a first link via a second station, a BA setup request frame sent by a first station, where the first station is one of multiple stations included in a first multi-link device, and the second station is one of multiple stations included in a second multi-link device. The multiple stations included in the second multi-link device work on multiple links, and the multiple links include the first link on which the second station works.

The BA setup request frame includes identification information that is of at least two links and that is used to indicate to request to set up a BA protocol.

The sending module 1902 is configured to send, on the first link via the second station, a BA setup response frame to the first station, where the BA setup response frame includes the identification information of the at least two links.

For content and functions of elements or fields included in the BA setup request frame and the BA setup response frame, refer to descriptions in the foregoing method embodiments. Details are not described herein again.

In another embodiment:

The receiving module 1901 is configured to receive, on a first link via a second station, an association request frame sent by a first station, where the first station is one of multiple stations included in a first multi-link device, and the second station is one of multiple stations included in a second multi-link device. The multiple stations included in the first multi-link device work on multiple links, and the multiple links include the first link on which the second station works and a second link on which another station works.

The association request frame includes request information of the second link, and the request information includes an index of the second link, an address of a station corresponding to the second link in the first multi-link device, and an identifier of a station corresponding to the second link in the second multi-link device.

The sending module 1902 is configured to send, on the first link via the second station, an association response frame to the first station, where the association response frame includes response information of the second link. The response information includes the index of the second link, the address of the station corresponding to the second link in the first multi-link device, and the identifier of the station corresponding to the second link in the second multi-link device.

For content and functions of elements or fields included in the association request frame and the association response frame, refer to descriptions in the foregoing method embodiments. Details are not described herein again.

It should be noted that, for implementation of the modules, refer to corresponding descriptions in the method embodiments shown in FIG. 4, FIG. 11, FIG. 14, and FIG. 16, to perform the methods and the functions performed by the second multi-link device in the foregoing embodiments.

Figure 20:
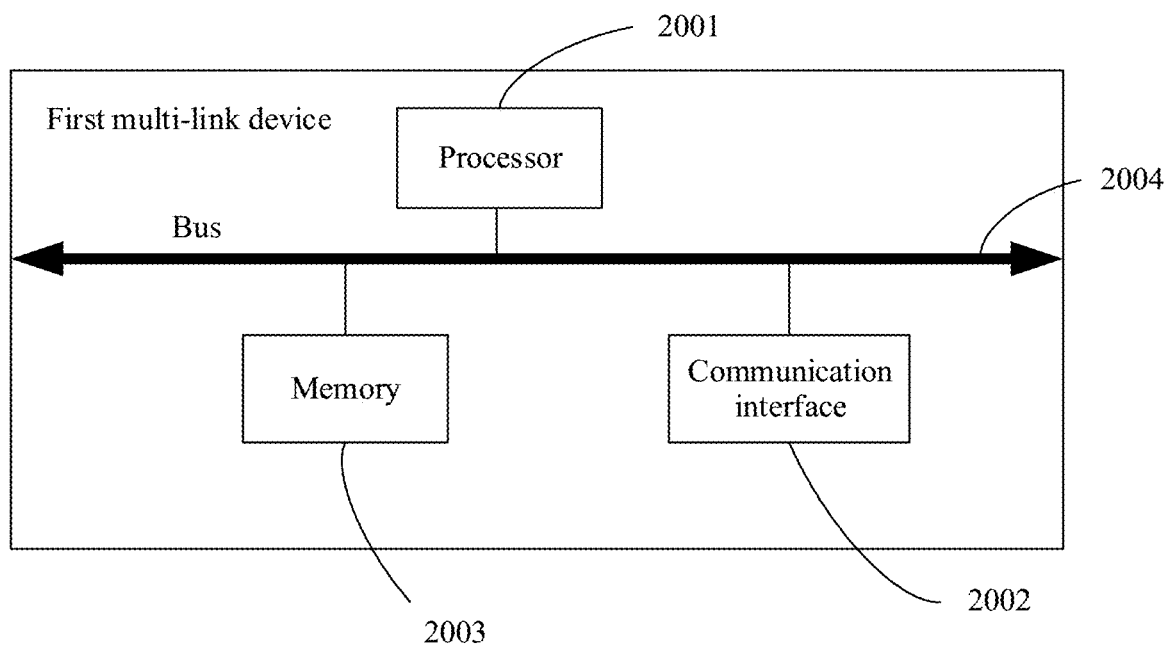
FIG. 20 is a diagram of a structure of a first multi-link device according to an embodiment of this application.

FIG. 20 is a diagram of a structure of a first multi-link device according to an embodiment of this application. As shown in FIG. 20, the first multi-link device may include at least one processor 2001, at least one communication interface 2002, at least one memory 2003, and at least one communication bus 2004.

The processor 2001 may be a central processing unit, a general-purpose processor, a digital signal processor, an application-specific integrated circuit, a field programmable gate array or another programmable logic device, a transistor logic device, a hardware component, or any combination thereof. The processor 2001 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The communication bus 2004 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 20, but this does not mean that there is only one bus or only one type of bus. The communication bus 2004 is configured to implement connection and communication between the components. The communication interface 2002 in the device in this embodiment of this application is configured to perform signaling or data communication with another node device. The memory 2003 may include a volatile memory, for example, a non-volatile dynamic random-access memory (NVRAM), a phase-change random-access memory (PRAM), or a magnetoresistive random-access memory (MRAM). The memory 2003 may alternatively include a nonvolatile memory, for example, at least one magnetic disk storage device, an electrically erasable programmable read-only memory (EEPROM), a flash storage device such as a NOR flash memory or a NAND flash memory, or a semiconductor device such as a solid-state drive (SSD). Optionally, the memory 2003 may be at least one storage apparatus located far away from the processor 2001. Optionally, the memory 2003 may further store a group of program code. Optionally, the processor 2001 may further execute a program stored in the memory 2003.

In an embodiment, the processor 2001 is configured to perform the following operations:

generating a radio frame via a first station, where the first station is one of multiple stations included in a first multi-link device, where the multiple stations included in the first multi-link device work on multiple links, and the multiple links include a first link on which the first station works; and sending, on the first link via the first station, the radio frame to a second station, where the radio frame includes at least two management frames, the at least two management frames are generated by at least two stations that work on different links in the first multi-link device, and the second station is one of multiple stations included in a second multi-link device.

For content and functions of elements or fields included in the radio frame, refer to descriptions in the foregoing method embodiments. Details are not described herein again.

In another embodiment, the processor 2001 is further configured to perform the following operations:

sending, on a first link via a first station, a block acknowledgment BA setup request frame to a second station, where the first station is one of multiple stations included in a first multi-link device, the second station is one of multiple stations included in a second multi-link device, the multiple stations included in the first multi-link device work on multiple links, and the multiple links include the first link on which the first station works, where the BA setup request frame includes identification information that is of at least two links and that is used to indicate to request to set up a BA protocol; and receiving, on the first link via the first station, a BA setup response frame sent by the second station, where the BA setup response frame includes the identification information of the at least two links.

For content and functions of elements or fields included in the BA setup request frame and the BA setup response frame, refer to descriptions in the foregoing method embodiments. Details are not described herein again.

In another embodiment, the processor 2001 is configured to perform the following operations:

sending, on a first link via a first station, an association request frame to a second station, where the first station is one of multiple stations included in a first multi-link device, the second station is one of multiple stations included in a second multi-link device, the multiple stations included in the first multi-link device work on multiple links, and the multiple links include the first link on which the first station works and a second link on which another station works, where the association request frame includes request information of the second link, and the second link in the first multi-link device, and an identifier of a station corresponding to the second link in the second multi-link device; and receiving, on the first link via the first station, an association response frame sent by the second station, where the association response frame includes response information of the second link. The response information includes the index of the second link, the address of the station corresponding to the second link in the first multi-link device, and the identifier of the station corresponding to the second link in the second multi-link device.

For content and functions of elements or fields included in the association request frame and the association response frame, refer to descriptions in the foregoing method embodiments. Details are not described herein again.

Further, the processor may further cooperate with the memory and the communication interface to perform operations of the first multi-link device in the foregoing embodiments of this application.

Figure 21:
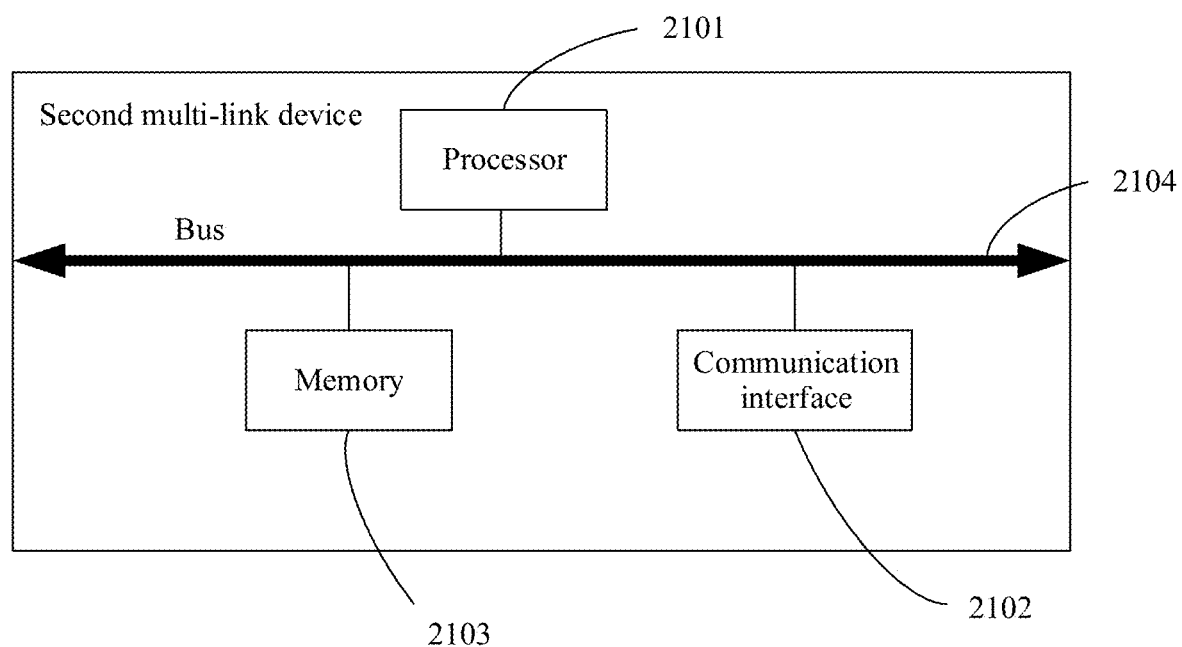
FIG. 21 is a diagram of a structure of a second multi-link device according to an embodiment of this application.

FIG. 21 is a diagram of a structure of a second multi-link device according to an embodiment of this application. As shown in the figure, the second multi-link device may include at least one processor 2101, at least one communication interface 2102, at least one memory 2103, and at least one communication bus 2104.

The processor 2101 may be processors of various types that are mentioned above. The communication bus 2104 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 21, but this does not mean that there is only one bus or only one type of bus. The communication bus 2104 is configured to implement connection and communication between the components. The communication interface 2102 in the device in this embodiment of this application is configured to perform signaling or data communication with another node device. The memory 2103 may be memories of various types that are mentioned above. Optionally, the memory 2103 may be at least one storage apparatus located far away from the processor 2101. The memory 2103 stores a group of program code, and the processor 2101 executes a program in the memory 2103.

In an embodiment, the processor 2101 is configured to perform the following operations: receiving, on a first link via a second station, a radio frame sent by a first station, where the first station is one of multiple stations included in a first multi-link device, the second station is one of multiple stations included in a second multi-link device, the multiple stations included in the second multi-link device work on multiple links, the multiple links include the first link on which the second station works, the radio frame includes at least two management frames, and the at least two management frames are generated by at least two stations that work on different links in the first multi-link device, where for content and functions of elements or fields included in the radio frame, refer to descriptions in the foregoing method embodiments, and details are not described herein again; and sending, on the first link via the second station, a response frame to the second station.

The response frame is a block acknowledgment frame, a starting sequence number field in the block acknowledgment frame is set to a temporary starting sequence number, the block acknowledgment frame includes a block acknowledgment bitmap, and the block acknowledgment bitmap is used to indicate that the second station starts, from the $1^{st}$ management frame, acknowledgment on whether the at least two management frames are correctly received.

In another embodiment, the processor 2101 is further configured to perform the following operations:

receiving, on a first link via a second station, a BA setup request frame sent by a first station, where the first station is one of multiple stations included in a first multi-link device, the second station is one of multiple stations included in a second multi-link device, the multiple stations included in the second multi-link device work on multiple links, and the multiple links include the first link on which the second station works, where the BA setup request frame includes identification information that is of at least two links and that is used to indicate to request to set up a BA protocol; and sending, on the first link via the second station, a BA setup response frame to the first station, where the BA setup response frame includes the identification information of the at least two links.

For content and functions of elements or fields included in the BA setup request frame and the BA setup response frame, refer to descriptions in the foregoing method embodiments. Details are not described herein again.

In another embodiment, the processor 2101 is further configured to perform the following operations:

receiving, on a first link via a second station, an association request frame sent by a first station, where the first station is one of multiple stations included in a first multi-link device, the second station is one of multiple stations included in a second multi-link device, the multiple stations included in the first multi-link device work on multiple links, and the multiple links include the first link on which the second station works and a second link on which another station works, where the association request frame includes request information of the second link, and the second link in the first multi-link device, and an identifier of a station corresponding to the second link in the second multi-link device; and sending, on the first link via the second station, an association response frame to the first station, where the association response frame includes response information of the second link. The response information includes the index of the second link, the address of the station corresponding to the second link in the first multi-link device, and the identifier of the station corresponding to the second link in the second multi-link device.

For content and functions of elements or fields included in the association request frame and the association response frame, refer to descriptions in the foregoing method embodiments. Details are not described herein again.

Further, the processor may further cooperate with the memory and the communication interface to perform operations of the second multi-link device in the foregoing embodiments of this application.

An embodiment of this application further provides a chip system. The chip system includes a processor, configured to support a first multi-link device or a second multi-link device to implement functions in any one of the foregoing embodiments, for example, generating or processing data and/or information in the foregoing methods. In an embodiment, the chip system may further include a memory. The memory is configured to store program instructions and data that are necessary for the first multi-link device or the second multi-link device. The chip system may include a chip, or may include a chip and another discrete component.

An embodiment of this application further provides a processor, configured to be coupled to a memory, and configured to perform any method and function related to the first multi-link device or the second multi-link device in any one of the foregoing embodiments.

An embodiment of this application further provides a computer program product including instructions. When the computer program product runs on a computer, the computer performs any method and function related to the first multi-link device or the second multi-link device in any one of the foregoing embodiments.

An embodiment of this application further provides an apparatus, configured to perform any method and function related to the first multi-link device or the second multi-link device in any one of the foregoing embodiments.

An embodiment of this application further provides a wireless communication system. The system includes at least one first multi-link device and at least one second multi-link device in any one of the foregoing embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objective, the technical solutions, and the beneficial effects of this application are further described in detail in the foregoing implementations. Any modification, equivalent replacement, or improvement made without departing from the spirit and principle of this application shall fall within the protection scope of this application.

What is claimed is:

1. A multi-link communication method, the method comprising:
    sending, on a first link by a first station, an association request frame to a second station, the first station and a third station are stations comprised in a first multi-link device, the second station and a fourth station are stations comprised in a second multi-link device, the stations comprised in the first multi-link device work on multiple links, the multiple links comprise the first link on which the first station and the second station work and a second link on which the third station and the fourth station work, the association request frame comprising a multi-link element, the association request frame comprising request information of the first link and the second link, and the request information of the second link is comprised in the multi-link element of the association request frame, wherein the multi-link element comprises: an information element identifier (element ID) field, a length (length) field, and an extended information element identifier (element ID extension) field and optional sub-element field, and wherein the optional sub-element field comprises a link index of the second link and an address of the third station corresponding to the second link in the first multi-link device; and
    receiving, on the first link by the first station, an association response frame sent by the second station.

2. The method according to claim 1, wherein the request information of the first link comprises an information element corresponding to the first link, and the information element corresponding to the first link comprises a first type information element and a second type information element, the first type information element carries common information of the information element corresponding to the first link and the information element corresponding to the second link, and the second type information element corresponding to the first link carries unique information corresponding to the first link.

3. The method according to claim 2, wherein the request information of the second link comprises an information element corresponding to the second link, the information element corresponding to the second link comprises the second type information element, and the second type information element corresponding to the second link carries unique information corresponding to the second link.

4. The method according to claim 1, wherein the request information of the first link comprises one or more of: an index of the first link, an address of the first station corresponding to the first link in the first multi-link device, and an identifier of the second station corresponding to the first link in the second multi-link device.

5. The method according to claim 1, wherein the association response frame comprises the response information of at least two links of the multiple links.

6. The method according to claim 5, wherein the response information of at least two links comprises the response information of the first link and the second link.

7. The method according to claim 6, wherein the response information of the second link includes one or more of: an index of the second link, an address of the third station corresponding to the second link in the first multi-link device, and an identifier of the fourth station corresponding to the second link in the second multi-link device.

8. The method according to claim 6, wherein the response information of the second link includes a status code field, and the status code is used to indicate whether the second link is successfully associated.

9. A multi-link communication apparatus applied to a first multi-link device, the apparatus comprising:
    a memory storing instructions; and
    at least one processor in communication with the memory, the at least one processor configured, upon execution of the instructions, to perform the following steps:
        sending, on a first link by a first station, an association request frame to a second station, the first station and a third station are stations comprised in the first multi-link device, the second station and a fourth station are stations comprised in a second multi-link device, the stations comprised in the first multi-link device work on multiple links, the multiple links comprise the first link on which the first station and the second station work and a second link on which the third station and the fourth station work, the association request frame comprising a multi-link element, the association request frame comprising request information of the first link and the second link, and the request information of the second link is comprised in the multi-link element of the association request frame, wherein the multi-link element comprises: an information element identifier (element ID) field, a length (length) field, and an extended information element identifier (element ID extension) field and optional sub-element field, and wherein the optional sub-element field comprises a link index of the second link and an address of the third station corresponding to the second link in the first multi-link device; and
        receiving, on the first link by the first station, an association response frame sent by the second station.

10. The apparatus according to claim 9, wherein the request information of the first link comprises an information element corresponding to the first link, and the information element corresponding to the first link comprises a first type information element and a second type information element, the first type information element carries common information of the information element corresponding to the first link and the information element corresponding to the second link, and the second type information element corresponding to the first link carries unique information corresponding to the first link.

11. The apparatus according to claim 10, wherein the request information of the second link comprises an information element corresponding to the second link, the information element corresponding to the second link comprises the second type information element, and the second type information element corresponding to the second link carries unique information corresponding to the second link.

12. The apparatus according to claim 9, wherein the request information of the first link comprises one or more of: an index of the first link, an address of the first station corresponding to the first link in the first multi-link device, and an identifier of the second station corresponding to the first link in the second multi-link device.

13. The apparatus according to claim 9, wherein the association response frame comprises a response information of the first link and the second link.

14. The apparatus according to claim 13, wherein the response information of the second link includes one or more of: an index of the second link, an address of the third station corresponding to the second link in the first multi-link device, and an identifier of the fourth station corresponding to the second link in the second multi-link device.

15. A non-transitory computer-readable storage media storing computer instructions that configure at least one processor, upon execution of the instructions, to perform the following steps:

sending, on a first link by a first station, an association request frame to a second station, the first station and a third station are stations comprised in a first multi-link device, the second station and a fourth station are stations comprised in a second multi-link device, the stations comprised in the first multi-link device work on multiple links, the multiple links comprise the first link on which the first station and the second station work and a second link on which the third station and the fourth station work, the association request frame comprising request information of the first link and the second link, the association request frame comprising a multi-link element, the association request frame comprising request information of the first link and the second link, and the request information of the second link is comprised in the multi-link element of the association request frame, wherein the multi-link element comprises: an information element identifier (element ID) field, a length (length) field, and an extended information element identifier (element ID extension) field and optional sub-element field, and wherein the optional sub-element field comprises a link index of the second link and an address of the third station corresponding to the second link in the first multi-link device; and receiving, on the first link by the first station, an association response frame sent by the second station.

16. The non-transitory computer-readable storage media according to claim 15, wherein the request information of the first link comprises an information element corresponding to the first link, and the information element corresponding to the first link comprises a first type information element and a second type information element, the first type information element carries common information of the information element corresponding to the first link and the information element corresponding to the second link, and the second type information element corresponding to the first link carries unique information corresponding to the first link.

17. The non-transitory computer-readable storage media according to claim 15, wherein the request information of the second link comprises an information element corresponding to the second link, the information element corresponding to the second link comprises the second type information element, and the second type information element corresponding to the second link carries unique information corresponding to the second link.

18. The non-transitory computer-readable storage media according to claim 15, wherein the request information of the first link comprises one or more of: an index of the first link, an address of the first station corresponding to the first link in the first multi-link device, and an identifier of the second station corresponding to the first link in the second multi-link device.

19. The non-transitory computer-readable storage media according to claim 15, wherein the association response frame comprises a response information of the first link and the second link.

20. The non-transitory computer-readable storage media according to claim 15, wherein the response information of the second link includes one or more of: an index of the second link, an address of the third station corresponding to the second link in the first multi-link device, and an identifier of the fourth station corresponding to the second link in the second multi-link device.

\* \* \* \* \*